HIGH-SPEED OPTICAL IDENTIFICATION OF PRINTED MATTER
Filed May 31, 1960
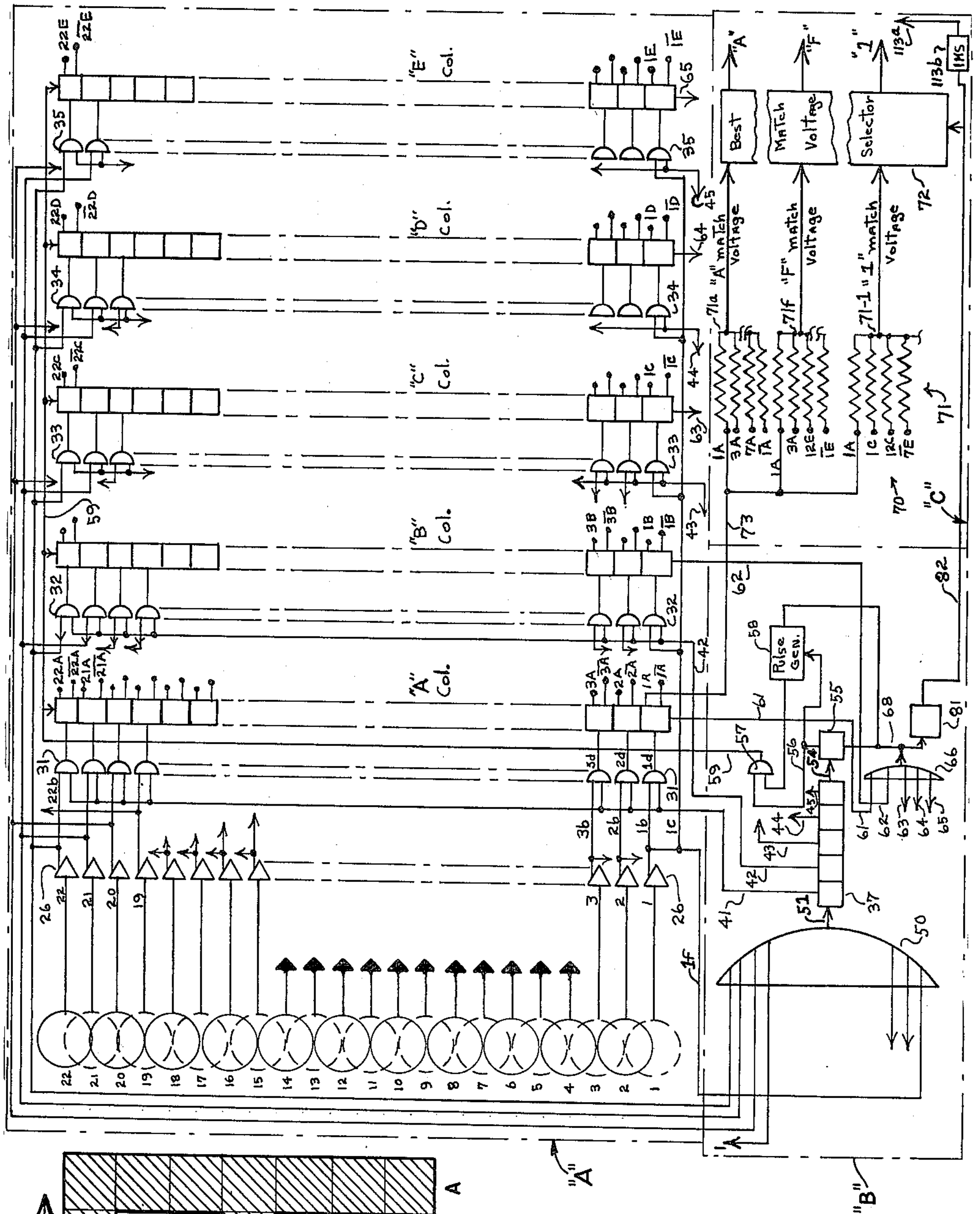
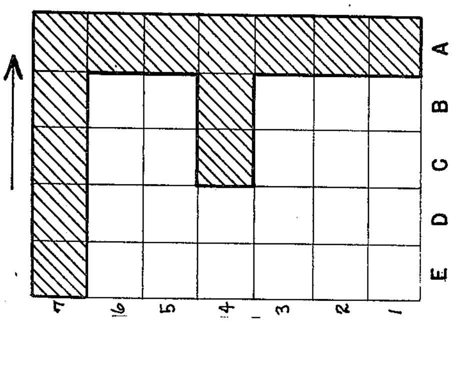
Fig. 1
INVENTORS
JACOB RABINOW
ARTHUR W. HOLT
WILLIAM FISCHER
LYLE W. MADER
BY Max L. Libman
ATTORNEY

INVENTORS
JACOB RABINOW
ARTHUR W. HOLT
WILLIAM FISCHER
LYLE W. MADER

BY Max L. Libman
ATTORNEY

INVENTORS
JACOB RABINOW
ARTHUR W. HOLT
WILLIAM FISCHER
LYLE W. MADER
BY Max L. Libman
ATTORNEY INVENTORS
JACOB RABINOW
ARTHUR W. HOLT
WILLIAM FISCHER
LYLE W. MADER
BY
Max L. Libman
ATTORNEY Sept. 17, 1963 J. RABINOW ET AL 3,104,369
HIGH-SPEED OPTICAL IDENTIFICATION OF PRINTED MATTER
Filed May 31, 1960 10 Sheets-Sheet 5
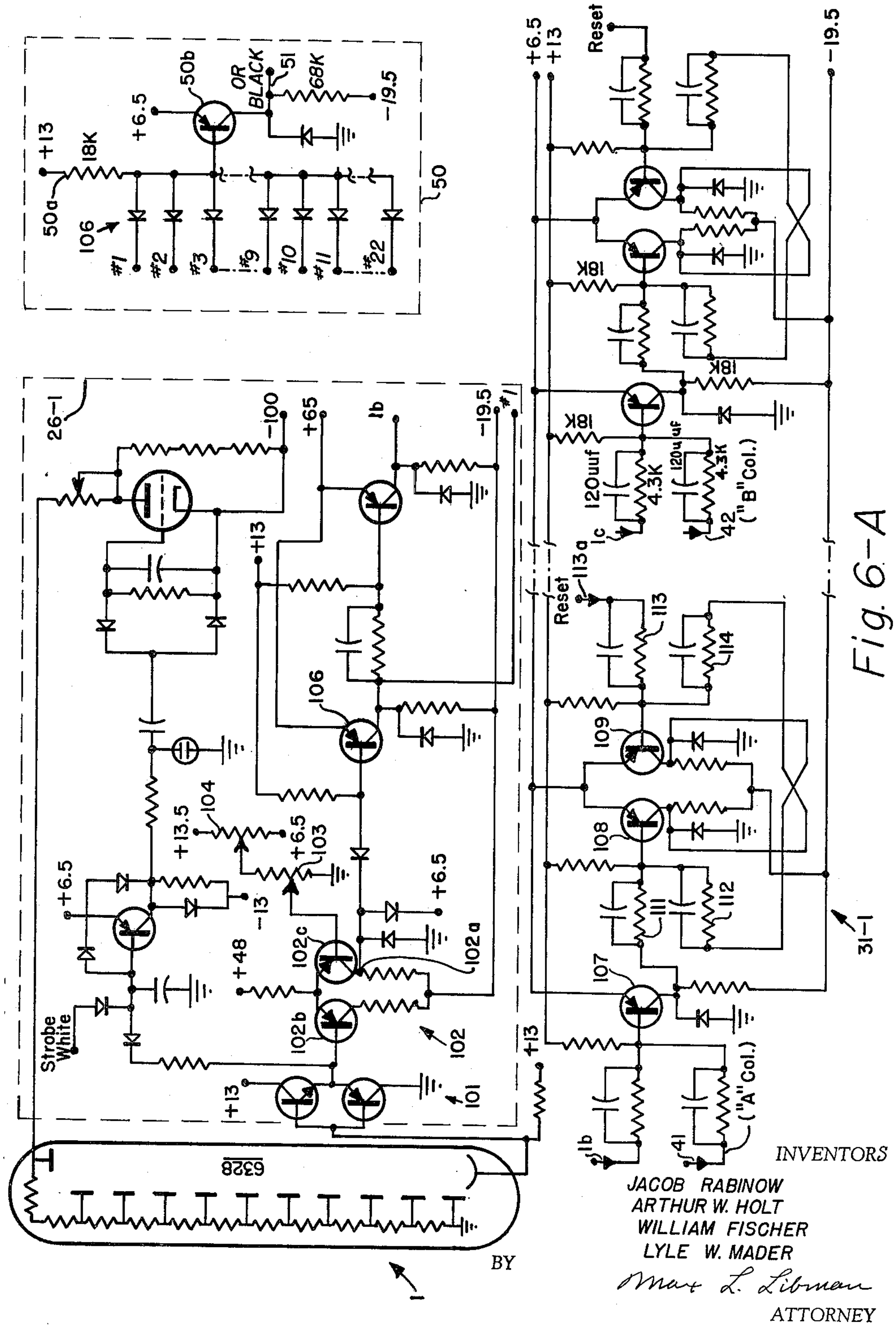
Fig. 6-A
INVENTORS
JACOB RABINOW
ARTHUR W. HOLT
WILLIAM FISCHER
LYLE W. MADER
BY Max L. Libman
ATTORNEY

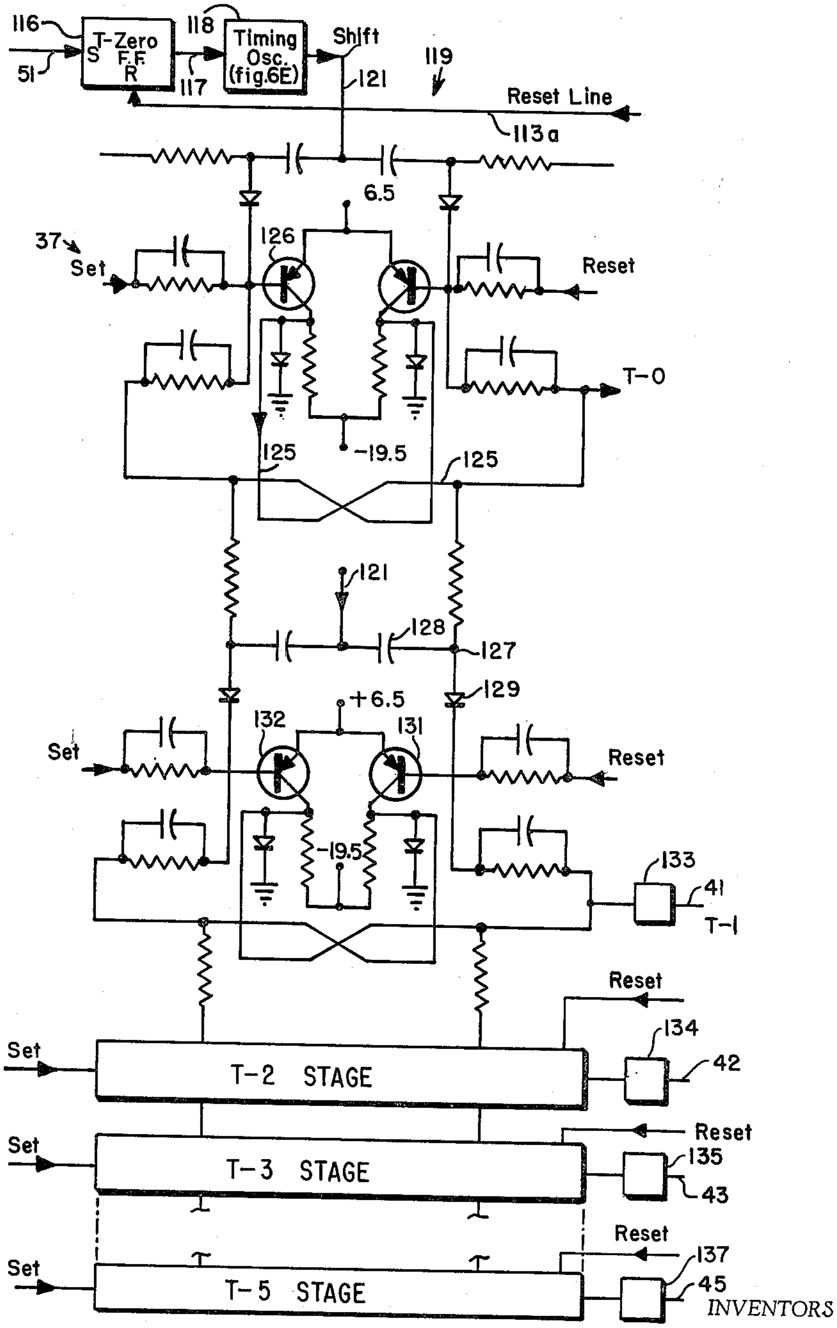
Fig. 6-B
INVENTORS
JACOB RABINOW
ARTHUR W. HOLT
WILLIAM FISCHER
LYLE W. MADER
BY
Max L. Libman
ATTORNEY HIGH-SPEED OPTICAL IDENTIFICATION OF PRINTED MATTER
Filed May 31, 1960 10 Sheets-Sheet 7
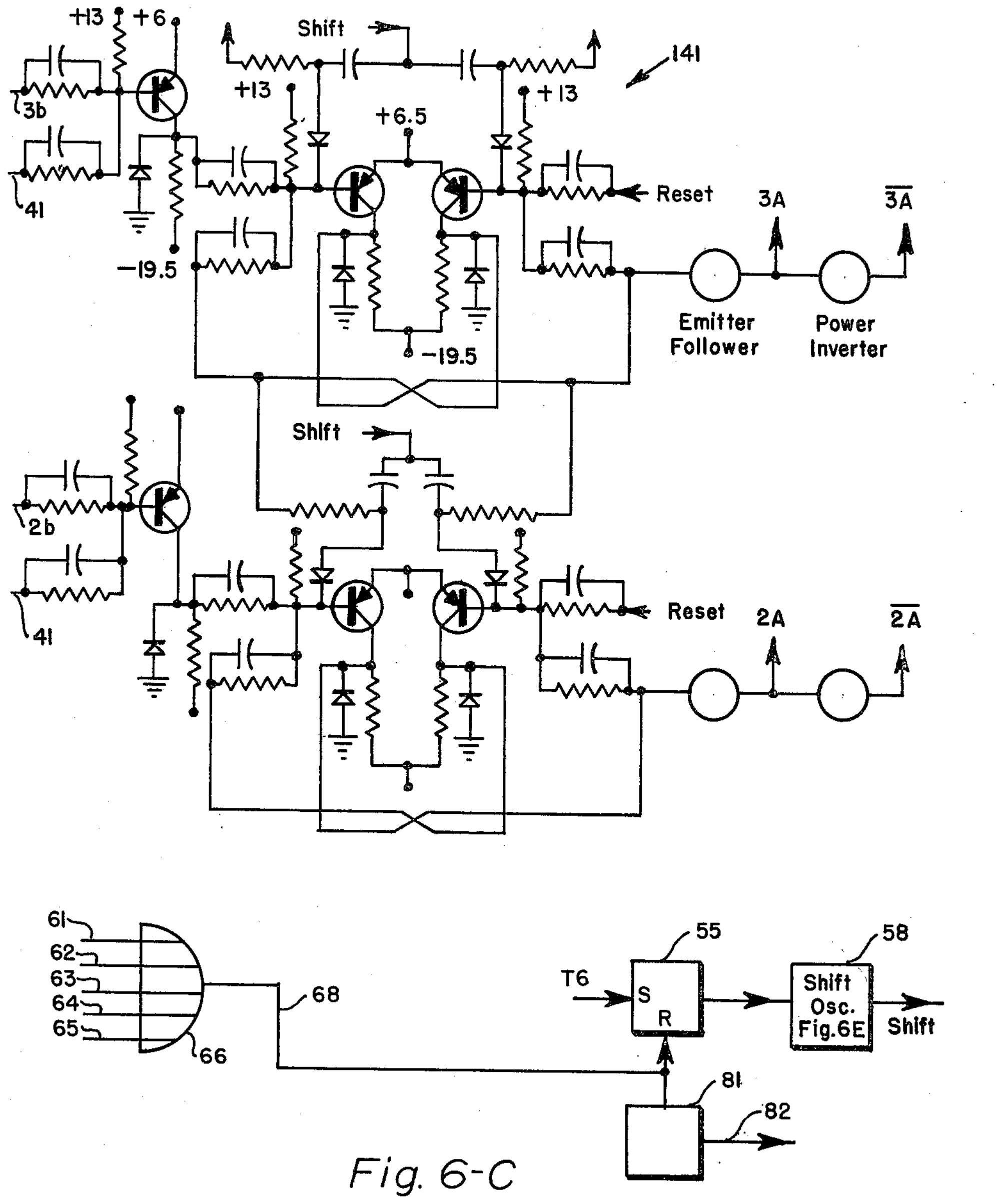
Fig. 6-C
INVENTORS
JACOB RABINOW
ARTHUR W. HOLT
WILLIAM FISCHER
LYLE W. MADER
BY Max L. Libman
ATTORNEY

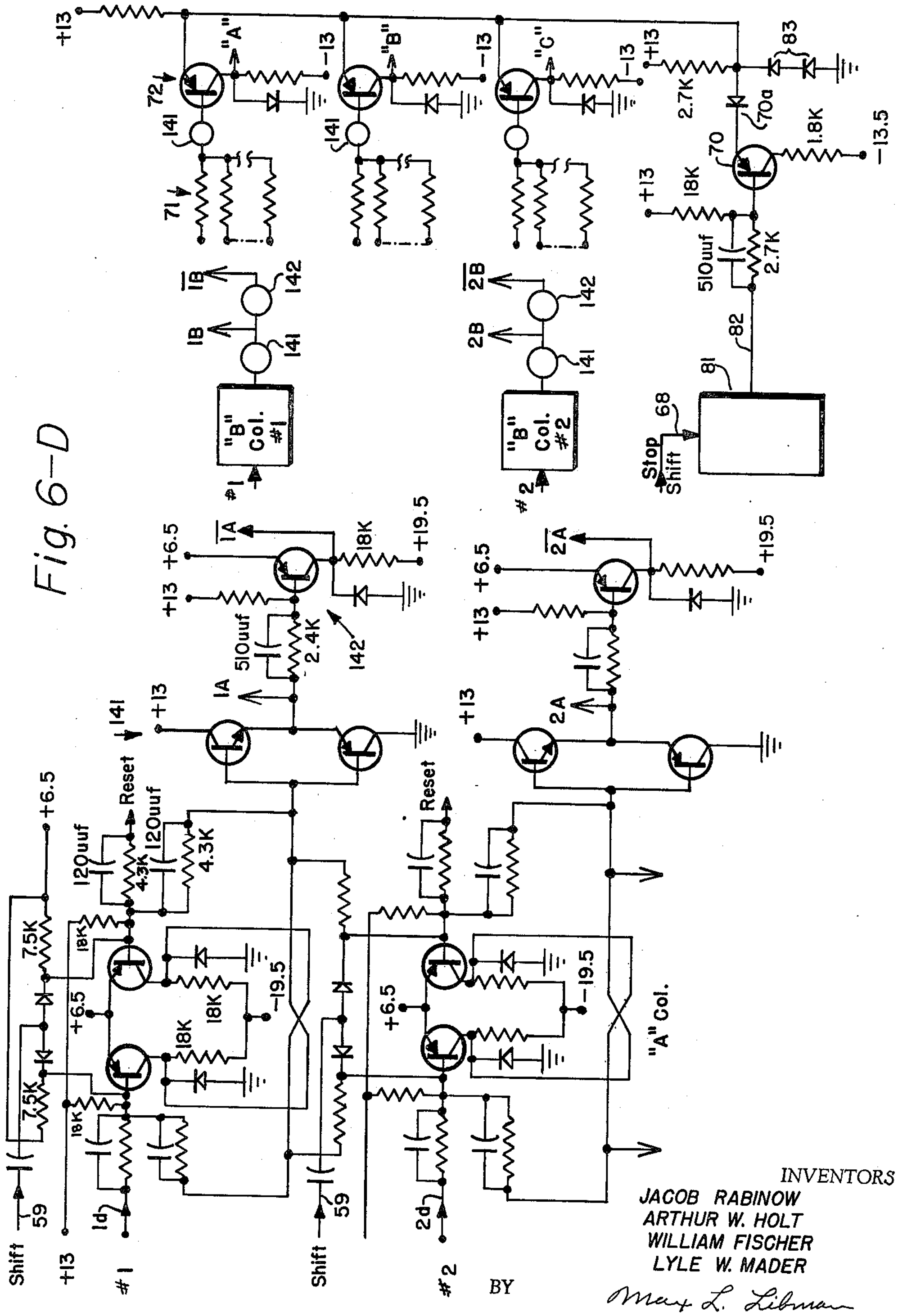
Fig. 6-D
INVENTORS
JACOB RABINOW
ARTHUR W. HOLT
WILLIAM FISCHER
LYLE W. MADER
BY Max L. Libman
ATTORNEY HIGH-SPEED OPTICAL IDENTIFICATION OF PRINTED MATTER
Filed May 31, 1960 
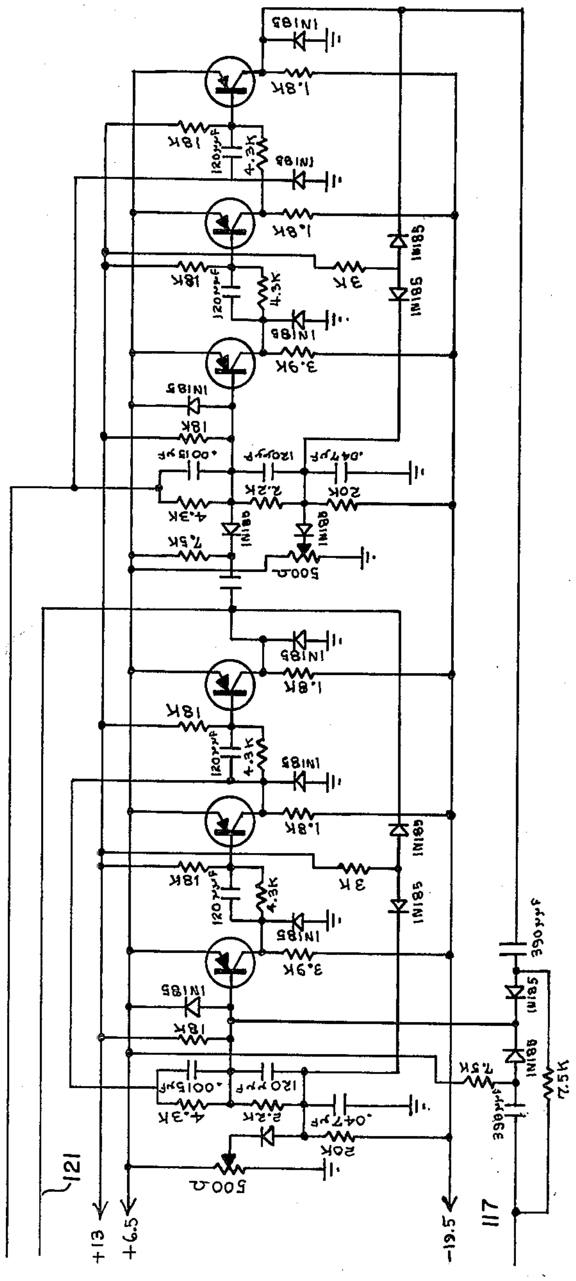
Fig. 6-E
INVENTORS
JACOB RABINOW
ARTHUR W. HOLT
WILLIAM FISCHER
LYLE W. MADER
BY Max L. Libman
ATTORNEY INVENTORS
JACOB RABINOW
ARTHUR W. HOLT
WILLIAM FISCHER
LYLE W. MADER
BY Max L. Libman
ATTORNEY

United States Patent Office 3,104,369

Patented Sept. 17, 1963

3,104,369

HIGH-SPEED OPTICAL IDENTIFICATION OF PRINTED MATTER

Jacob Rabinow, Takoma Park, Arthur W. Holt and William Fischer, Silver Spring, and Lyle W. Mader, Olney, Md., assignors, by direct and mesne assignments, to Rabinow Engineering Co., Inc., Rockville, Md., a corporation of Maryland Filed May 31, 1960, Ser. No. 32,911
16 Claims. (Cl. 340—146.3)

This invention relates to a machine and system for the high-speed identification of printed matter, and more specifically for the recognition and reading of characters printed in any font, at very high speeds. Although the primary use of the invention is in connection with a machine or system for reading alpha-numerical characters printed in any particular font, the basic nature of the apparatus is such that it can be made to recognize any character that the human eye is able to recognize.

In many operations of industry and government, documents must be imprinted with alphabetic characters and numerals in such a manner that they can be read both by machines and by humans. This is particularly true of documents such as checks, money orders, credit slips, receipts, shipping tickets, the paper tapes produced by adding machines and cash registers, etc. Many of these documents return to the issuing organization or to their agents and are, for that reason, called turn-around documents. Such turn-around documents must, at some stage in their existence, be handled and read by humans and must, therefore, be readable without specialized equipment, in addition to being read at high speed by machines.

There are a great many other applications for reading machines where the printing of the document to be read is not under the control of the designer of the machine which is to read the document. Examples of this class are the reading of books already in existence, magazine articles from many sources (including foreign sources) and letter correspondence. A very important case is the reading of typewritten addresses on letter mail to aid in the automatic sorting of mail.

Many attempts to solve the problems of character recognition have been made. Where it is possible to control the initial print, such as in turn-around documents, much effort has been spent in developing special systems which will decrease the expenses of the reading machine and increase its speed and reliability. Such turn-about documents can be imprinted with various specialized types of fronts which are readable by human users, but which have special features making them easy to read by machine.

Another method involves the use of double systems where the human eye reads the ordinary character and the machine reads the perforations in the paper or special marks in the vicinity of the character. Use of punch cards is well known and will not be touched upon here, but some comment must be made about the so-called double printing of characters and marks. This requires special equipment since the space alloted to the usual character is not adequate for printing both, and certainly much of the present day equipment for typing and printing can not be easily converted to this double font. There have also been a few attempts to so distort the characters that simple machines can recognize the characters as essentially a set of coded marks.

A great variety of machines have also been proposed for the reading of characters whose printing was not under the control of the designer of the reading machine. One such reading machine is described in U.S. Patent No. 2,933,246, of Jacob Rabinow, issued April 19, 1960, for "Reading Machine." In this technique, an image of the character is superimposed on an optical mask which is a photographic reproduction of the letter. The unknown character is compared in turn to each of the known photographic masks and the decision as to which character is scanned is made by picking the photographic mask which most nearly agrees with the unknown character. This reader-value judgment is called the technique of the "best match." The primary difficulty with the photographic mask type of machine is that registration adjustments in at least one dimension must be made mechanically or optically, and the machine is therefore slowed down because of this.

Another general technique for recognizing characters is to break up the characters into segments which are smaller than the whole. These segments can be recorded photographically on optical masks and compared to various parts of the character. This can also be done electronically without optical masks. This technique suffers not only from the registration problems but also from the fact that decisions are made which are based on parts of the character rather than on the whole character; there are invariably more mistakes made in recognizing characters when decisions are made on parts rather than on the whole.

It is a primary object of the invention to provide a character reading machine capable of reading characters with a high degree of accuracy at very high speeds, in the order of thousands of characters per second.

Another object is to provide means for electronically reading characters despite small vertical misalignment of the characters.

Still another object is the provision of a new type of correlation matrix for determining a predetermined degree of correlation between a complex unit of information in one form and an electrical device designed to be actuated by a particular complex unit of information. More specifically, it is an object of the invention to analyze a unit of complex information by breaking it up into a number of constituent elements of different values, the relationship of which values identifies the unit of information, and separately supplying said values to the individual resistors of a resistance matrix arranged to have an optimum electrical output when the respective input signals bear a predetermined relationship.

It is also an object to provide means for recognizing separate characters to be read, even when the characters overlap in the direction in which they are being read.

A further object is to provide novel means for recognizing the best match between a character being read and any one of a group of possible characters of which it is a part.

An important object of the invention is to provide means for storing information representing a character by subdividing the area covered by the character in two different directions into a two-dimensional array of small elemental areas, scanning said elemental areas individually to determine whether a portion of said character occupies a significant part of each elemental area, and storing said information in a memory register having a separate memory cell corresponding to each elemental area.

To overcome the difficulties formerly encountered, we have invented a new type of reading machine which takes care of vertical registration by means of electronic shifting and which recognizes characters as a whole, by the use of resistor correlation matrices. The technique will be illustrated by characters constructed in the "5 x 7" font, but it will be apparent that the invention is not limited to any specialized font.

The specific nature of our invention, as well as other objects and advantages thereof, will clearly appear from a description of a preferred embodiment, as shown in the accompanying drawings, in which:

FIG. 1 is a block diagram of the entire machine composed of three sections: the signal section, the control section and the recognition section;

Figure 7:
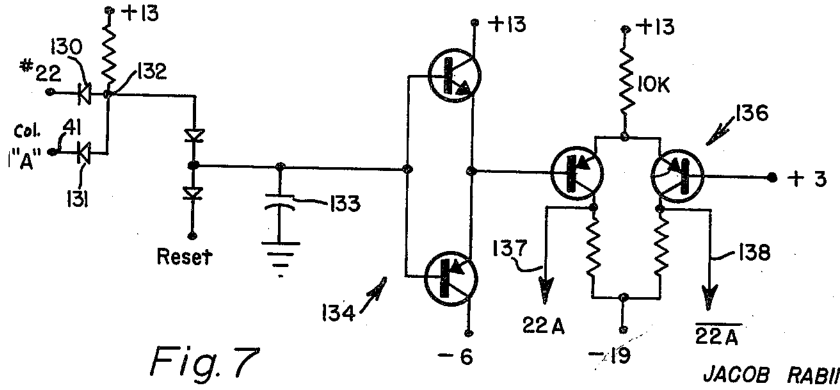
Figure 4C:
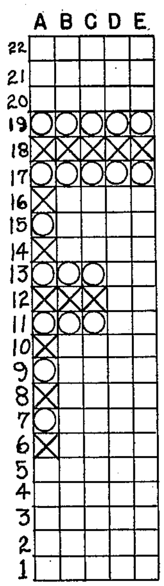
Figure 4A:
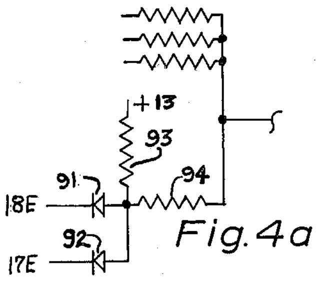
Figure 4B:
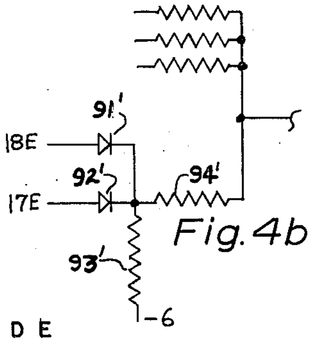
Figure 4D:
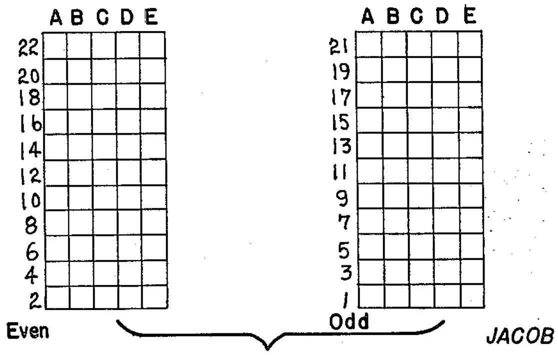
Figure 4E:
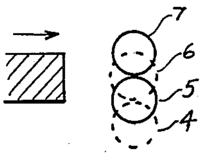
Figure 5:
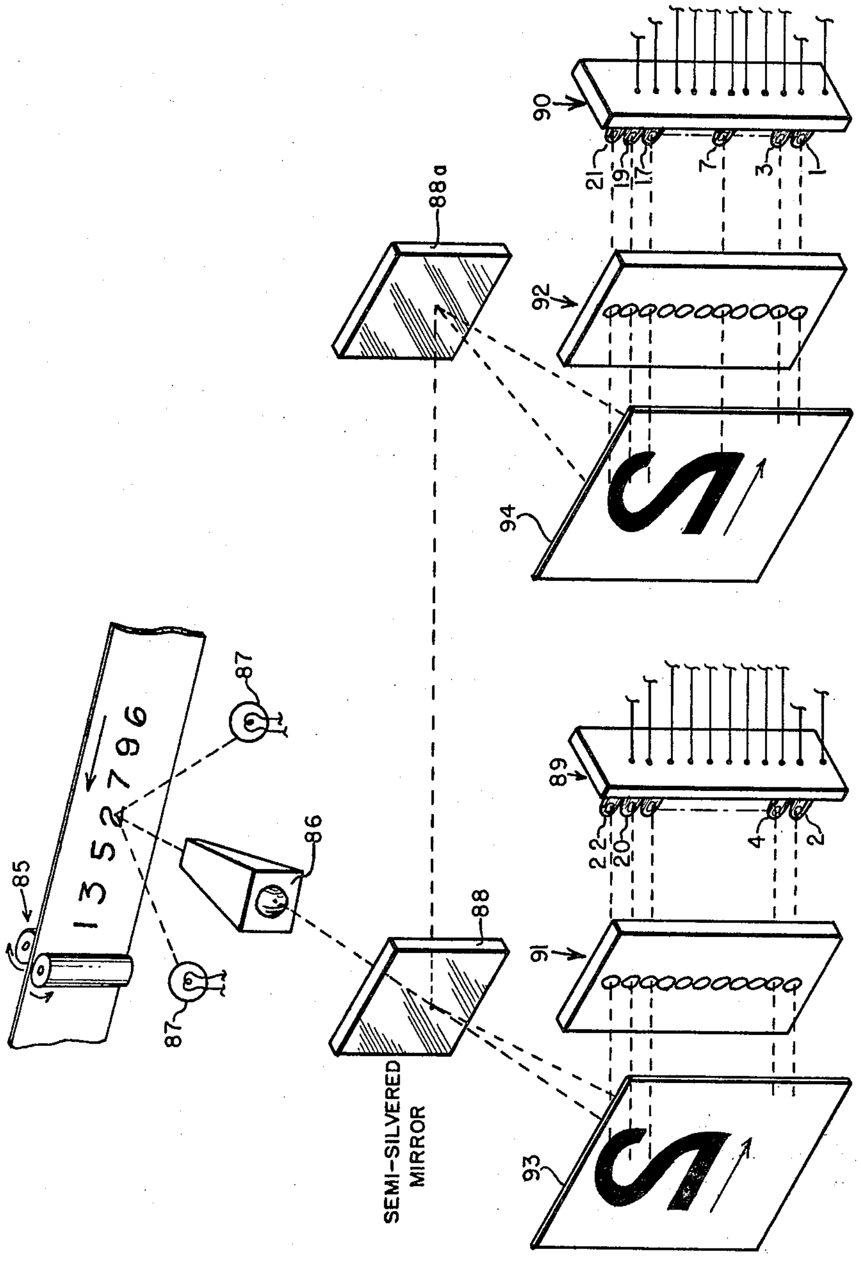
Figure 8:
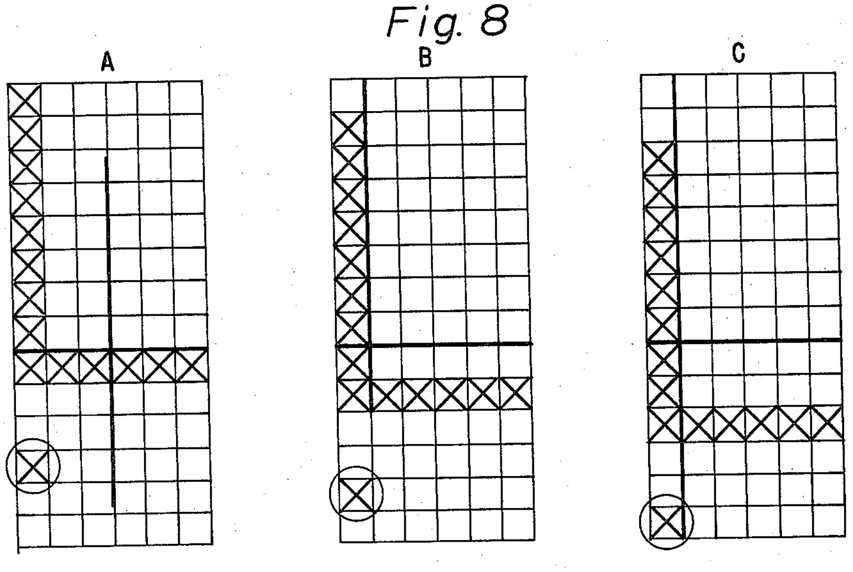
Figure 9:
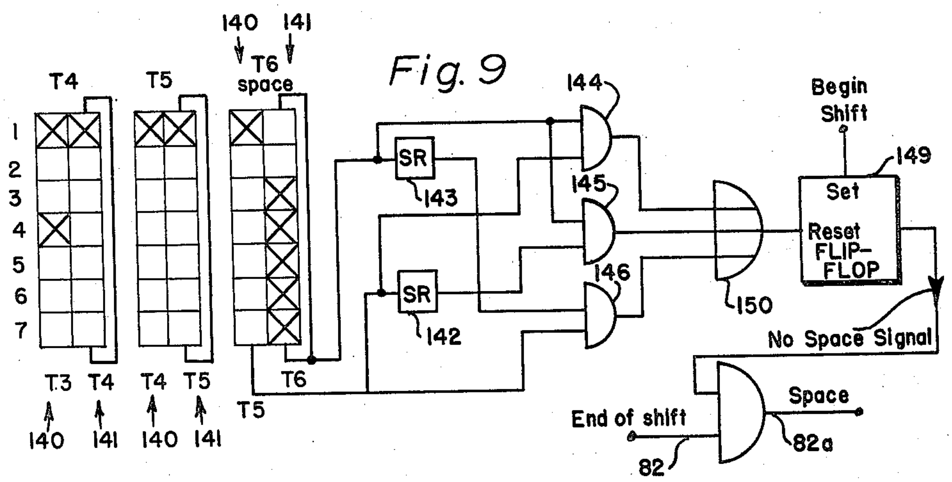
Figure 9A:
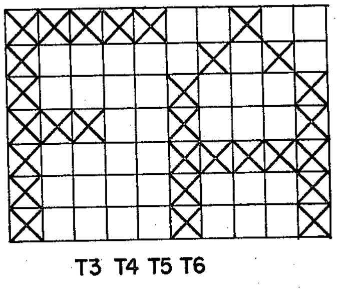

FIGS. 4*a* and 4*b* show circuit details of two alternative OR-gating circuits;

FIGS. 4*c* and 4*d* are explanatory matrix drawings used in explaining the operation of the system;

FIG. 4*e* is a further explanatory drawing;

FIG. 5 is a schematic perspective representation of an optical sensing system according to the invention;

FIGS. 6*a* through 6*e* show typical circuit details of the various components of the circuit of FIG. 1, identified in each case by the same reference characters as in FIG. 1;

FIG. 7 is a schematic circuit diagram showing character recognition using capacitor-type analogue storage;

FIG. 8 is a diagram illustrating three different methods of positioning characters; and FIGS. 9 and 9*a* illustrate the principle of the "snake" detector.

GENERAL DESCRIPTION OF THE OPERATION OF THE SYSTEM

In FIG. 1 there is shown a schematically descriptive block diagram of the entire machine. At the left of the signal section are shown photocells numbered from 1 to 22. These photocells over-lap each other by 50%. Another way of saying this is to describe the geometry of the photocells as if one row of photocells consists of 11 of the photocells just touching each other and the other row consists of 11 cells which are moved ½ photocell higher. The aperture diameter of each photocell is approximately equal to the edge dimension of one of the square elements which make up a "5 x 7" font in which the representative letter "F" is shown. (If a font other than a "5 x 7" is used, the photocell aperture should be set to approximately be equal to the size of the smallest element which it is desired to recognize.) All of the photocells, it is to be noted, are effectively in one vertical line, i.e., they all read the same vertical line at the same time.

Just to the left of the photocell column, the image of a character "F" is shown reversed as it appears to the set of photocells after being magnified as shown in FIG. 5. This is, of course, the same as reading the character directly as it moves from left to right into the field of view of the photocell. The image of the character moves to the right across the photocells due to the motion of the paper on which the character is printed. Note that the character is shown appearing almost up to the top of the column of photocells. As will be explained below, any vertical position of the character can be tolerated so long as the vertical extremities of the character appear entirely within the top and bottom photocells. Most of the characters in the "5 x 7" font are exactly 7 elements high and 5 wide. Due to the overlap of the photocells, the character height is equal to 14 photocells rather than 7, but in vertical position shown, the character is fully scanned by the odd cells 9–21 inclusive.

Each of the photocells 1 to 22 is connected to its own correspondingly numbered photocell amplifier of the vertical group of amplifiers 26, only the top and bottom few being shown for clarity. The output of each of these photocell amplifiers, 26–1 to 26–22, is a binary signal indicating whether the photocell is seeing white or black at that instant. In other words, the photocell output is quantized to two states. Each of the photocells preferably has an individual control for adjusting the level at which its output switches from white to black; and there is also preferably a single control which adjusts the quantizing level up or down for the set of photocells as a whole, as will be explained in detail below.

The output of each photocell amplifier 26–1 to 26–22 is tied to the inputs of five AND-gates shown arranged in five columns labeled 31 to 35 respectively. For example, the out of amplifier 26–1 is connected by line 1–*b* to AND-gate 31–1; by line 1–*c* to AND-gate 32–1, etc. Each of these AND-gates is a two-input AND-gate. A two-input AND-gate is a device well known in computer technology which requires that both signals be present at its input before an output is given. For example, the output of photocell amplifier 26–1 is connected by line 1*b* to one input of the AND-gate which loads the 1A flip-flop and by line 1C to the 1B flip-flop, the 1C flip-flop, the 1D flip-flop and the 1E flip-flop; the output of the photocell amplifier 26–2 is connected to the AND-gate which loads flip-flop 2A, the AND-gate which loads flip-flop 2B, etc. It will be seen with reference to FIG. 1 that there are five columns of flip-flops; these columns of flip-flops are labeled the A column, the B column, etc., corresponding to the five arbitrary vertical divisions of our 5 x 7 font. As we have just said, each of the AND-gates which loads these flip-flops is driven by a photocell amplifier at its corresponding vertical position. The other input of these AND-gates is driven by a signal from the "timing generator" 37, explained in detail below. This timing generator will give out a signal on each of five wires in sequential order; these wires are labelled 41–45 respectively.

Turning now to the "control section" of FIG. 1, it will be seen that all photocell outputs are brought to a 22-input OR-gate, 50. This OR-gate which is a circuit well known in the computer art is a circuit such that if there is a signal present on any one or more of the inputs, an output occurs from the gate. This gate is used to start the timing cycle for the loading of a character into the storage flip-flop. The manner in which this happens is as follows: As soon as one of the photocells sees "black," i.e., the leading edge of a letter, its amplifier 26 emits a signal, e.g. on line 1*f* for photocell 1 which produces an output on line 51 from the OR-gate. This output starts the timing generator 37. The timing generator produces first a pulse on the wire labeled 41, next produces a pulse on the wire labeled 42, and so forth until a pulse has been produced on wire 45. The rate at which these respective wires are energized is designed to be proportional to the rate at which the paper moves past the photocells. We prefer to use a constant paper speed, and therefore, in this case, the time between energizing each of these wires is a fixed length of time. Specifically, if the entire character (which is 5 elements wide), corresponding to sections *A–F* of the "5 x 7" font grid passes over the photocells in 300 microseconds, we arrange the timing register to emit a very short pulse of about 1 microsecond duration on the wire 41 at exectly 30 microseconds after the first "black" has been recognized. The wire 42 will be energized at 90 microseconds after the timing register has been started, etc.

When these timing pulses are applied to the two input AND-gates 31–1 to 31–22 which load the A register flip-flops, the net result is that the first column of flip-flops will be loaded at a time "A," which is 30 microseconds after the beginning of the timing cycle. The second column of register flip-flops will be loaded at time "B" 60 microseconds later, the third at time "C," etc. The net result of this activity is, therefore, to store in the flip-flops a quantized image of the character which has just been scanned. If each light bulb of a 5 x 22 matrix of light bulbs is connected to each of the register flip-flops in such a way that when the flip-flop was "set" its light bulb was lit, then the scanning of a character would result in having light bulbs lit at every point in the 5 wide by 22 high matrix which was "black" on the original 5 x 7 character. We have thus far accomplished nothing more than scanning a character and storing it in X—Y coordinates. The character will now appear at some vertical height in the register matrix. The character will nominally be 14 units high out of the 22, and 5 units wide on the 5 x 7 grid which covers the character. The character will appear at various heights in this matrix because the vertical registration of the characters is slightly different from one character to another. This can be due either to vertical changes due to printing difficulties, or it can be due to vertical changes due to slight vertical motions of the paper as it moves past the photocells. Because this vertical height does not normally help us to recognize the character, we desire to eliminate this variation in vertical position from our storage register. This is accomplished by shifting all columns of the register flip-flop downward simultaneously until a "black" is recognized as being at the bottom of any one or more than one of the five columns. In more detail, this operation is accomplished as follows. After the timing register has delivered a last loading pulse on the wire 45, the wire 54 is pulsed to shift down all columns. This is easily accomplished, for example, by using the pulse on wire 54 to set a flip-flop 55, the output of which, on lead 56, opens AND-gate 57 to admit cycling pulses from pulse generator 58 to common lead 59, which simultaneously shifts down all the registers A–E. All of the register flip-flops are tied together (as explained in detail below) in the logical relationship known to the computer art as a shift register. A shift register, in this case, can be described simply as being a set of flip-flops whose binary information can be shifted from one flip-flop to the next upon command of a shift signal. Thus, if the lowest "black" in the first column was in position number 7, this "black" would be shifted from 7 to 6, then from 6 to 5, and so forth until it reached 1. At this time the "stop shift" OR-gate 66 is energized. This is the OR-gate which has leads 61–65, coming respectively from the lowest stage of the five registers as its inputs. Meanwhile all the rest of the information stored in the register flip-flops is being shifted in synchronism, as all registers are receiving shift pulses on line 59. The net result is that the entire image is shifted downwards; it may be said that the image has been "normalized" with respect to its vertical position. As soon as OR-gate 66 receives a signal on any of its leads 61–65, it emits a signal on line 68 to reset flip-flop 55 to thus stop the shifting operation.

The next step is to recognize which character has been stored. Attention is directed to the "recognition section" 70 of FIG. 1. The recognition of characters is accomplished in our system by using what we call resistor correlation matrices, one of which is shown at 71. Small sections of a few of these resistor matrices are shown in the recognition section of FIG. 1 by way of example. The object of each resistor matrix is to produce a voltage which is characteristic of how well the stored image matches with each of the possible perfect characters which it is desired to recognize. If it is desired to recognize, for example, 10 numbers and 26 alphabetic characters, there may be (in a simplified case) 36 different voltages developed as the reading mechanism above described scans each of the 36 possible characters, and sends the result to the 36 resistor matrices, each of which develops a different output voltage in response to the same input information. Each of these voltages will be developed by a set of resistors which are tied together at one point, e.g. **71*a*, 71*b*, 71*c***, etc. and which are driven from various points in the five flip-flop register columns. There will be one set of resistors for the "A" match voltage, one set for the "B" match voltage, etc., as will now be explained.

Lt us take, for example, the "F" which is shown on FIG. 1. After the vertical down-shifting has occurred, "blacks" will be stored in 1A, 2A, 3A, up through 14A. In the B column, "blacks" will be stored in 7B and 8B, 13B and 14B in the C column, "blacks" will be stored in 7C and 8C, 13C and 14C; in the D column, "blacks" will be stored in 13D and 14D; in the E column, "blacks" will be stored in 13E and 14E. This is what we would now call a perfect "F."

Each register flip-flop has two outputs. One of these is called the assertion and the other output is called the negation. For example, flip-flop A1 has two outputs 1A and $\overline{1A}$, of which 1A is the assertion and $\overline{1A}$ is the negation. If the flip-flop has been set to "black" the assertion output is equal to 0 volts, while the negation output is at +6 volts; if, on the other hand, the flip-flop has not been set (is storing a "white") the assertion output is at +6 volts and the negation output at 0 volts.

The object is now to select the proper points to which resistors should be connected to give a match voltage for the character "F." The way to do this is to tie a resistor to each of the assertions that are expected to be "black" for an "F." Thus, we should connect one resistor to the assertion 1A, another resistor to the assertion of 2A, 3A, and so forth up the A column to 14A. In the B column, we should connect 7, 8, 13 and 14. Similarly we should connect resistors to the C column flip-flop assertions 7, 8, 13 and 14; in the D column we should connect resistors to the assertions to 13 and 14; and similarly for the E column. If "F" is scanned and a perfect image of it is obtained in the matrix flip-flop, the "F" match voltage will be exactly 0 volts. If 2 or 3 of the "blacks" are missing, then these 2 or 3 resistors will be held up to +6 volts, i.e., 6 volts will be applied to their inputs instead of 0 volts; the result of this will be a voltage which is still close to 0. In the illustration of FIG. 1, only four resistors are shown in the resistor matrix which produces the "F" match voltage. These resistors are tied to 1A, 3A, 12E and $\overline{1E}$. Only lead 73 connecting the 1A terminal is shown by way of example but it will be apparent that the other resistors are similarly connected. The symbolism of drawing a bar over the $\overline{1E}$ is that this point should be attached to the negation output of the 1E flip-flop rather than the assertion. The reason for doing this is that in addition to wiring in the "blacks" which we expect to have present for an "F," it is also desirable to wire in certain "whites" which are expected to be present. These "whites" should be judiciously chosen in such a way that their presence helps to distinguish between two characters which might otherwise give similar match voltages. Thus, the big difference between an "E" and an "F" is the bar across the bottom, which is present in the "E" but not present in the "F." If we just used all of the "blacks" in a normal "F" as assertions without using any "whites" as negations, we would find that all of the assertion flip-flops used in developing the "F" matrix voltage had been set to "black" by the "E." This would give a mistakenly perfect voltage out of the "F" matrix. If, on the other hand, we provide two or three negations along the bottom line in the positions which the bottom bar of an "E" would also make "black," we will find that these negation points give two or three points of +6 volts when an "E" is scanned, and therefore the output of the "F" resistor matrix becomes a good deal less than perfect, certainly, less than the "E" resistor matrix.

Similarly, resistor matrices are developed and wired for all of the characters and numerals and symbols which one desires to recognize. Every time a character had been scanned each of these resistor matrices develops a voltage which is characteristic of how well the image of the scanned character matches with the particular resistor matrix points chosen to represent that character. The voltage range goes between 0 volts (which is perfect) and +6 which represents a condition of no match whatever.

The recognition of which character has been scanned is now accomplished by using only one final step. This final step is the selection of the best match voltage, which is done in the best match selector circuit 72 as will be shown below. The selection of the best match voltage is accomplished very simply by comparing all of the match voltages together and selecting which voltage is the nearest to 0. It is very important to note that we do not make any absolute judgment on whether a character is absolutely an "F" or absolutely an "A"; rather, we decide that a character is more like an "F," or more like an "A" than it is like any other character. This is an important distinction because it allows for a number of points to be wrong in the character image and still have the correct character be chosen.

It is possible and desirable to weight individual points differently. This is very helpful, for example, in distinguishing between "O" and "Q"; the resistors connected to the flip-flops which store the black tail points for Q can be paralleled or can be smaller in value than the other resistors in the matrix, thus emphasizing the distinction between these two letters.

An equipment will now be described for selecting the best match voltage, but it should be emphasized that such equipment is described only by way of example, and not as limiting the invention.

It will be noted that the above described apparatus shows a plurality of resistance matrices each corresponding to a particular character, and measures the correlation between the signals obtained by these matrices from the elemental areas of the character being scanned (or its image). Alternatively, the respective signals could be taken from each elemental area, in which case, in the above example, there would be a set of 35 signals, and the set would, of course, be different from each character being scanned, since each character has a different configuration. The set of signals is therefore a measure of the character. This set of signals, in digital form (binary digits in the present case, which considers only black or white), can be compared in a modern digital computer, by known techniques, with stored data in the computer (said stored data corresponding to a desired font) to determine which character of the font each set most nearly corresponds to.

It will be understood that while a single row of photocells has been shown, there could be, in the present example, five rows of such cells, in which case the entire character can be scanned at one time; this would, of course, be more expensive of equipment, but would permit higher reading speeds. Conversely, a single photocell could be used with vertical sweep scanning, which would require less photocell equipment, but more auxiliary equipment to produce the vertical sweep, and would also be slower. The use of a single row of photocells is a compromise which has proved to be practical in a physical embodiment of the invention.

It will be further understood that instead of noting the received optical signal as only black or white, as shown above, the signal could equally well be quantized into several degrees of "grayness," and the comparison made on the basis of the resulting signal would contain more information than the simple black or white conversion. The black-or-white system shown is only one example of the general case of quantizing the strength of the received signal. Depending on the amount of light received, the signal could be delivered, e.g. as one of three possible values, black, gray, or white, by an obvious extension of the same circuit techniques as will be shown below in detail for the black and white case; or it could be digitalized into any desired scale from black to white by converting the optical signal sensed by the photocell into an electrical signal of corresponding analog value, then converting this analog value into a digital signal by means of any known type of analog-to-digital converter.

DESCRIPTION OF THE EQUIPMENT USED TO SELECT THE BEST MATCH VOLTAGE

Figure 2:
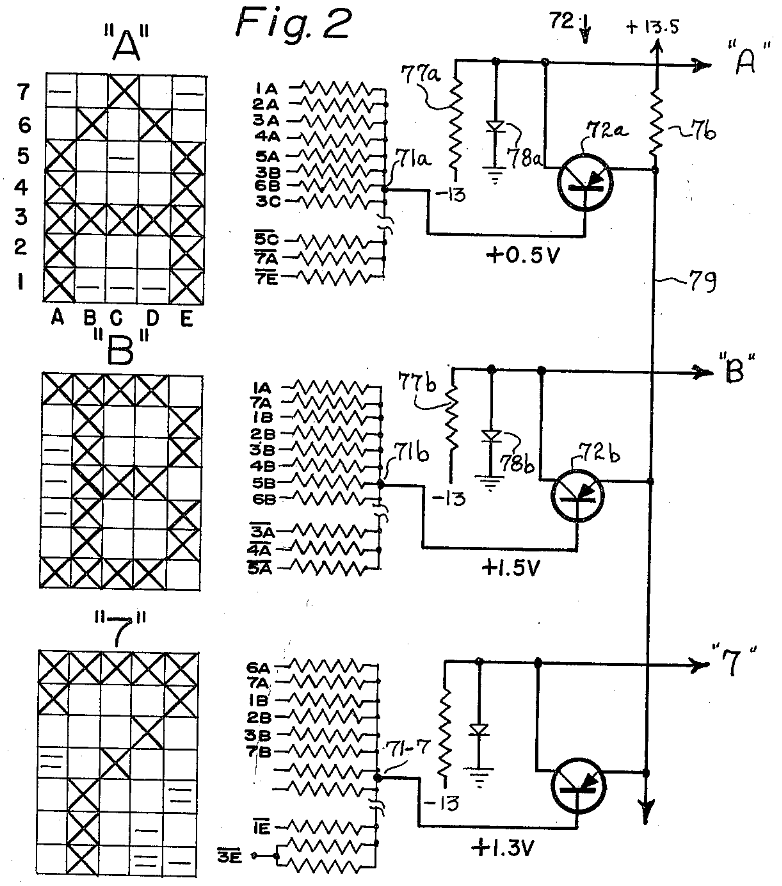
FIG. 2 is a circuit diagram used to explain the principle of operation of the recognition section.

FIG. 2 shows a schematic of three selected resistor matrices and the method for obtaining the best match voltage. Let us start off with the matrix which develops the best match voltage for the character "A." As has been described previously, each of the resistors in section 71 is tied to the output of a flip-flop, from the flip-flop register above described. The particular flip-flop to which a resistor is tied is denoted by a symbol such as 1A, 3A, 12B, etc. When a symbol has a bar over the top such as $\overline{2B}$, this means that this resistor is tied to the negation of the flip-flop rather than the assertion. When a "black" is stored in a flip-flop the assertion wire is 0 volts and a negation wired is +6 volts. When a "white" is being stored in this flip-flop, the reverse is true. We therefore see that, taking the resistor matrix for the letter "A" shown at the upper left of FIG. 2, if all of the flip-flops to which assertions are tied are storing "blacks," and if all of the flip-flops to which negations are tied are storing "whites," the match voltage is equal to 0 volts. If a few of these points are wrong (some of the flip-flops which should have been "black" are "white," and some of the flip-flops which should have been "white" are "black") the resulting match voltage will be something more positive than 0 volts. Let us say that we have scanned an "A," that some of the points are wrong, and that the resulting match voltage for "A" was equal to 0.5 volt. At the same instant that the match voltage for "A" was 0.5 volt, the match voltages for every other resistor matrix in the system was some other voltage. We have designed our resistor matrices so that the match voltage of each of these other matrices should be more positive than 0.5 volt, because the combination of "blacks" and "whites" which has been stored will have many more "wrong" points for each of these other matrices than for "A" matrix. Let us say, for example, that the resulting voltage for "B" was +1.5 and the resulting matrix for "8" was +1.3.

Attached to each of the match voltage points *71a*, *71b*, etc., is a transistor connected in the configuration shown in section 72 of FIG. 2. In this configuration, all of the emitters of PNP transistors *72a*, *72b*, etc. shown in this circuit are tied together to a common resistor 76 of value 2.7K. The other end of this resistor is connected to +13.5 volts. Each of the collectors is hooked to −13 volts through a 6.8K resistor *77a*, *77b*, etc. Each collector is also clamped by a diode *78a*, *78b*, etc., so that it cannot rise above 0 volts. The match voltage point output of the "A" resistor matrix is tied to the base of its comparator transistor *72a*, the "B" resistor matrix output is tied to the base of its comparator transistor *72b*, etc. The easy way to understand how this circuit works is to first view the circuit as if each of them were an emitter follower whose emitters were all tied to a common resistor. This would now look like an analog OR-gate in which the output emitter voltage will be covered by that best voltage which has the most negation of all the best voltages. Thus, in the case we have chosen, where the "A" match voltage is +0.5, the "B" match voltage is +1.5 and the "C" match voltage is +1.3, the emitter voltage will be covered by the +0.5 voltage, since it is the most negative of the group. Specifically, with the transistor and with the resistor values shown, the voltage at the common emitter point, i.e., line 79, is equal to 0.2 volt more than the lowest base voltage, due to the drop in the transistor, and with the input voltages assumed in this case, the common emitter voltage will be about +0.7 volt. In other words, the common emitter point is equal to the best match voltage +0.2 of a volt.

Note now what is happening to the various collector voltages. The comparator transistor *72a* is conducting, since base to emitter current is flowing; because of this, there will be current flowing in the emitter to collector circuit, and this current will bring the collector up from −13 volts to ground. The other transistors, however, are "cut-off," because their emitters are, in every case, more negative than their bases. No collector current is able to flow, therefore, in the comparator transistor for "B" and for "8," for example. No collector current is found, consequently, in either of these transistors, and so the output collector voltage remains at −13 volts. We therefore see that the circuit shown has selected the most negative input voltage, and has identified that voltage by producing a signal going from −13 volts up to ground on one of three output wires. The signal on this wire therefore constitutes a recognition by the apparatus that the letter being scanned at that instant is an "A." This signal can be used to print the letter out, or it can be supplied to a known high-speed computer such as a "Univac" for computational, selection or storage purposes, etc. The machine has now "read" the letter "A," and similarly can read any other character presented to it. A practical machine of this type has been constructed which can read the characters of a font for which its resistor matrix is wired, at the rate of 2,000 characters per second.

DETAILS OF THE BEST MATCH SELECTOR CIRCUITS

FIG. 2 shows a simple circuit illustrating the principle of obtaining the best match. The usual practical case is somewhat more complex.

Figure 3:
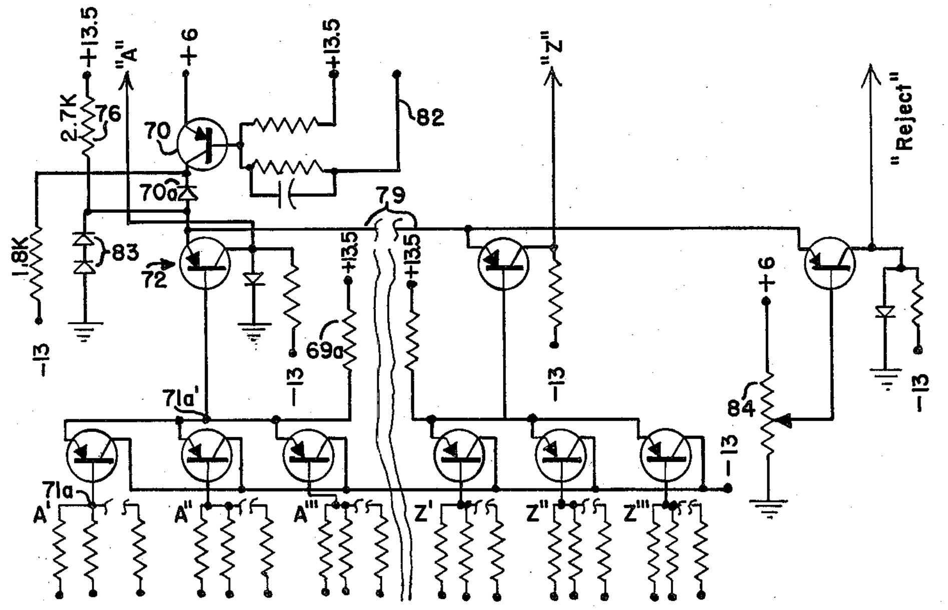
FIG. 3 is a more detailed circuit diagram of a part of the recognition section.

FIG. 3 illustrates a more detailed circuit for this purpose, and shows how three important requirements are met. The first requirement is the OR-gating of several resistor matrices into a single comparator transistor; the second relates to the method by which selection is allowed to occur only during the selector cycle timing; and the third relates to the method by which a limit is set to the worst match voltage which will be accepted as a genuine recognition.

In many practical character reading situations, there are cases where it is necessary to have several resistor matrices, each of which is a slightly different description of the same character. (One obvious situation requiring this is if the machine is to recognize a number of different character fonts at the same time—an "A" may be slightly different in every case out of ten fonts.) It would be possible, of course, to run each one of these desired resistor matrices into its own comparator transistor. The digital output of the comparator transistor could be later OR-gated digitally to give a single "A" output; this OR-gating to be, however, accomplished prior to the comparator transistor by the circuit shown in FIG. 3. Each resistor matrix output (e.g., $A^{1}$, $A^{11}$, $A^{111}$) drives its own emitter follower 69, and the outputs of all these emitter followers are tied together to a common emitter resistor 69*a*, at 71*a*$^{1}$. This common point, 71*a*$^{1}$, then drives the comparator transistors 72. What is accomplished here is actually an analog OR-gating of the match voltages from the matrices, since the output of the emitter follower OR-gate is always determined by the most negative of its inputs. This system has several advantages over the use of individual comparator transistors followed by digital OR-gates. First of all, the number of components required is less; but more importantly, power gain is obtained at a point where it is very useful to have. This power gain is obtained in the OR-gate emitter followers; it would be perfectly practical to use diodes at this point but they do not give any power gain.

The second function which is shown in detail in FIG. 3 is accomplished by the circuit which allows selection to occur only at selector cycle time. Referring back to FIG. 1 briefly, we see an OR-gate 66 which we call the "bottom" OR-gate. This OR-gate gives out a pulse when anyone of the flip-flops at the bottom of each column has a "black" transferred to it on any one of lines 61–65 by the downward shifting pulses. This pulse stops the down shift, as explained, and also sets the selector cycle flip-flop 81. It is now time to allow the comparator transistors to make their selection of which match voltage is the "best match voltage." This is accomplished by the circuit shown in the upper righthand corner of FIG. 3. The output of the selector cycle flip-flop 81 goes from +6 volts to 0 volts on line 82 when it is the proper time to allow the comparator transistors to operate. Prior to this time, the common emitter points for the comparator transistors 72 have all been sitting at about −1.8 volts. This is because the comparator control transistor 70 is cut off and its collector resistor is pulling negative strongly through its coupling diodes to the common emitter line 79. The common emitter line is allowed to go only to −1.8 volts because of the action of the two diodes 83 in series tied to ground. These diodes are silicon diodes which have a forward voltage drop of about .8 volt at the currents which are flowing in the circuit. (Diodes used as voltage limiters in their forward direction such as illustrated in this circuit have been called "stabistors.") Since the common emitter point of all the comparator transistors is −1.8 volts, and the lowest possible voltage for any of the bases is 0 volts, all of the comparator transistors 72 will be cut off; and collectors will therefore all be at −13 volts. At the time when it is desired to make the selection, the output from the selector cycle flip-flop on line 82 goes from +6 volts to 0 volts. The comparator control transistor 70 is turned on by this drive and its resulting collector pulse goes up to its emitter voltage, which is +6 volts. This action puts the coupling diode 70*a* in the reverse direction and thus allows the voltage at the common emitter point to be controlled by whichever base voltage is most negative. Thus, at this time, the selection of the best match voltage is allowed to be made, namely, when the flip-flop storage register A–E has bottomed.

The third function of this circuit is the manner in which the worst tolerable match voltage is established. At the bottom of FIG. 3 is shown a potentiometer 84 which is connected between +6 volts and ground. Potentiometer 84 is set at some voltage such as, perhaps, +2 volts. If, at selector cycle time, there is no output from any of the resistor matrices which is more negative than some predetermined voltage, say +2 volts, then this reject comparator transistor will draw current and its collector voltage will come up from −13 volts to ground. This signifies that the character which has been scanned does not match any of the resistor matrices well enough to be identified, and therefore the apparatus, in effect, states that it cannot read the material it is scanning.

FIG. 4*a* illustrates the type of OR-gating which may become necessary and useful if severely skewed characters are used. Let us suppose that we want to provide a standard pull-down current. If the flip-flop signal on either line 18E or 17E is black, we would like to pull a standard resistor down to 0 volts. This can be accomplished by hooking the assertion of 18E to the cathode of a diode 91 and the assertion of 17E to the cathode of another diode. The two cathodes are connected together at the junction of two resistors 93 and 94. One of these resistors, 94, is the standard value matrix resistor such as shown at 71 in FIG. 1 and the other of these, 93, is a resistor whose other terminal is connected to +13 volts. Resistor 93 is of such a value that when both the assertions of 18E and 17E are at 6+ volts this junction point will rise to +6 volts, being clamped there by the output of the register flip-flops OR-gating through the respective diodes. The net result of this simple circuit is a type of OR-gating in that if either 18E or 17E (or both) goes to ground, then the input to resistor 94 is driven to ground. If, on the other hand, both of these inputs are +6 volts, then the driving point of the standard resistor 94 is at +6 volts. Thus it can be seen that we have here a circuit which will give a single weight of desired assertion if either of the two input flip-flops is black, and will subtract a single weight from the match voltage if neither of these two inputs is present. The converse of this is shown in FIG. 4*b*. The object here is to produce a circuit which will subtract a standard weight from the match voltage if either of the two inputs is white. In this case, the flip-flops are connected to the anodes of the diodes 91′ and 92′, and the cathodes are connected together to the junction of the two resistors, 93′ and 94′. If either point 18E or point 17E is set at +6 volts, then the driving point of resistor 94′ will be +6 volts. This will result in making the match voltage look constant.

FIG. 4*c* shows the geometrical relationship of the 5 x 14 grid of flip-flops of FIG. 1 registering the letter "F," but not reversed.

FIG. 4*d* is merely another way of arranging the matrix shown in FIG. 4*b*. We have simply taken one half the points out of FIG. 4*c* into an "odd" matrix, and the other one half of the points out of FIG. 4*c* into an "even" matrix. Logically there is no difference between these two forms, i.e., between the single matrix which includes both odd and even points, and the arrangement using separate odd and even matrices. This last organization is a little neater from the logical standpoint, since we will find that most of the resistor matrices are derived from either all odd points or all even points; the ability to cross couple the matrices as in FIGS. 4*a* and 4*b* is still maintained. If the odd set of flip-flops is kept separate from the even set of flip-flops in so far as the shift registers are concerned, a fairly subtle operational change takes place which may sometimes be helpful and, in other cases, may not be helpful. If the odd set of flip-flops is a self-contained shift register and has its own shifting circuits and its own mechanism for stopping the shifting as soon as any one of the bottom points sees a "black," and if the even set has an identical but separate set of machinery, then it will be seen that the two sets of data can be operated upon completely independently. One of the advantages of this is that the shift-down speed can be doubled for any particular type of shift register mechanism. If, for some reason, it was desired that the information pass through both sets of flip-flops while shifting downwards, it would be impossible to construct independent shift registers. The ability to independently stop the shifting in each of the two sets allows the designer to either stop the shifting for each set when one of its own bottom flip-flops sees black, or the shifting for both sets can be stopped when either one sees a bottom black. In general, the decision as to which type of "stop shift" system should be used is, at present, an empirical decision made on the basis of trying out the various media to be read. In a given case, the quality of printing will determine which system is best.

MECHANICAL ASPECTS OF SCANNING

FIG. 5 shows a schematic mechanical drawing of the scanner assembly. Shown here are the following items: the paper transport 85, the lens system 86, the lighting system 87, the one-half silvered mirror 88, full reflecting mirror 88*a*, a column of even numbered photocells 89, and a column of odd numbered photocells 90, and lens systems 91 and 92 for the respective photocells.

The paper transport 85 may be any one of a number of mechanisms. One basic type is the type which moves individual documents along in a straight line as shown so that one row of printing is scanned. Another type of paper transport would be one which was designed to scan a number of lines of printing on the same sheet of paper. Such a system might involve a rotating drum upon which the page to be scanned is attached. The lens system and photocells may, in such an arrangement, be caused to traverse axially along a drum. However, the details of the transport are not the subject of the present invention.

The lens system used may be conventional in some applications, but in most applications it is found desirable to be able to split the image into two sections. The reason for this is that we desire to be able to have the overlapping even and odd photocells previously described. Thus, by using a one-half silvered mirror 88 in which one image goes straight through and the other image is reflected at 90°, it is possible to put eleven photocells 1 to 21, shown at 89 tangent to each other which view the direct image, and another set of eleven photocells 2 to 22, shown at 90 also tangent to each other which view the reflected image. It is then possible to vertically offset the column of even numbered photocells from the column of odd numbered photocells in such a way that the desired overlapping of one cell by another cell is obtained.

Half-silvered prisms may be used instead of half-silvered mirrors if desired. The advantage of the prism over the mirror is that only single images are obtained from a prism; since a half-silvered mirror has always a front surface and a back surface, there will always be multiple images, even though the secondary and higher order reflections are rather well attenuated in a well designed mirror.

It is also possible to use two independent lens systems, one lens system for the odd numbered photocell column, and another lens system for the even numbered column. These will be set, necessarily, at an angle with respect to each other, but the angle will be almost unimportant since only a single line element out of a character is being scanned at any one moment; this vertical line element is all that has to remain in focus on the photocells.

Both the photomultiplier type of photocell and solid state type of photocell have been used successfully in this type of reading machine. The photomultipliers have the advantage that they are enormously more sensitive than any semiconductor type, but they have the disadvantage that they are physically bulky and that they require high voltage for their operation. Because of their bulk it is necessary to use large magnification ratios in the optical system when photomultipliers are used. When semiconductor devices, such as the Texas Instrument type 2175 photocell, are used, the over all dimensions of the scanning assembly are greatly reduced. The amount of light necessary is, however, greatly increased.

The direct image of the character being scanned is thrown reversed on screen 93, which is scanned by photocells 89, each of which sees only an area corresponding to the portion of the image covered by its associated lens 91, each of which is positioned so as to see only one-seventh of the vertical height of the inverted image. Similarly an identical image is thrown on screen 94 and similarly scanned by photocells 90, except that the vertical placement of the lenses 92 and photocells 90 is such that the respective areas they see interlace the areas seen by the odd-numbered cells.

SCHEMATIC DIAGRAMS

FIGURES 6*a* through 6*e* show the block unit schematics for a typical reading machine which was constructed. We start with FIG. 6*a*. The photocells used in this case were photomultiplier tubes which have a number of electrodes which are biased to various voltages ranging from −1100 volts down to ground. The final anode is biased at +13 volts and drives into a set of double emitter followers 101. The double emitter followers drive a quantizing circuit which, in this case, is a so-called differential amplifier 102. This differential amplifier has the signal from the double emitter follower 101 on the base of one of its transistors. The base of the other transistor is connected to the variable point on the potentiometer 103. One side of this potentiometer is at ground potential and the other side goes to a potentiometer 104 which is common for all of the quantizing circuits in the system. The potentiometer 104 which is common to the system runs between +6 volts and +13 volts and by varying this, the opeartor can vary the quantizing point for all of the amplifiers in the system at one time. The term "quantizing" means, in this application, the decision as to whether the particular spot which is being scanned by the photomultiplier should be called "black" or should be called "white." When the voltage on the first base 102b is more positive than the voltage on the second base 102c the collector voltage of the second transistor goes up from ground to +6 volts. This drives a standardizing transistor to cut off in such a way that its collector then drops to ground. This point 102a is called the output of the photocell amplifier and now produces what will be called a standard pulse. All of the outputs of the amplifiers will then be either zero volts or +6 volts. The presence of a zero volt signal indicates that the photocell is seeing black at that instant, and the presence of a +6 volt signal indicates that the photocell is seeing white at that instant. Note that the changing of the potentiometer 103 which sets the second transistor base in the quantizing circuit can adjust the point at which the swtich over between black and white occurs.

The outputs of the photocell amplifiers go to a number of points. One of the points to which they go is to OR-gate 50 (see also FIG. 1). This OR-gate consists of 22 diodes 106. Each of the cathodes is connected to a photocell amplifier. All of the anodes are hooked together to a common load resistor 50a. A transistor 50b inverts this signal. The object of this OR-gate circuit is to produce a signal called "OR BLACK." The OR BLACK signal occurs when any one or more of the input amplifiers sees a black. This OR BLACK signal will be used to start a timing register which was described in connection with FIG. 1.

We shall now pick out one amplifier and follow it through the loading of its signals into its associated shift register stages, taking, for example, photocell number 1. Photocell number 1 is connected to five points as shown in FIG. 1. One is into the AND-gate $31^{-1}$ for the A column, one into the AND-gate $32^{-1}$ for the B column, and similarly for the C column, D column, and E columns. These gates are shown in FIG. 1 and serve to load the various shift register columns. The other input to the AND-gate $31^{-1}$ is the pulse which is called "load column A" on line 41. The collector of each AND-gate circuit transistor, e.g. 107, will be at +6 volts unless both of the input points are at +6 volts, in which case the collector will drop to zero volts. The output of this AND-gate transistor is then used to set the number 1 flip-flop in the A column. The flip-flops are composed of two transistors, 108 and 109, each of which has two input resistors. One of the input resistors, 111, to the transistor 108 is connected to the collector of the gating transistor 107. The other input resistor, 112, is connected to the collector of the transistor 109. Transistor 109 has also two similar input resistors. One of these, 113, is connected to the "reset" bus 113a which is used to clear all of the flip-flops to the zero or "white" condition before any character is scanned. The other of these resistors, 114, is cross coupled to the collector of the transistor 108. This arrangement forms a "flip-flop" and is well known in the art. The operation of this flip-flop can be described as follows: let us suppose that the right-hand transistor of the flip-flop is conducting. This represents what we mean by the zero state, and we will also call this state the "white" state. In this state the collector of the right-hand transistor will be at +6 volts. The left-hand transistor will be cut-off therefore, if in addition, the collector of the gating transistor is also at +6 volts. The collector of the left-hand transistor of the flip-flop will therefore be at zero volts and it will be pulling down the input resistor to the right-hand transistor. This results in helping the right-hand transistor to continue conducting. The other state is also a stable state, i.e., when the left-hand transistor is conducting, its collector will be returning the right-hand transistor by nonconducting, and the right-hand transistor (being cut-off) will help the left-hand transistor to stay conducting. In order to load a black into this flip-flop, it is necessary that the photocell be seeing black; this results in the point labeled 1b being +6 volts. If, at this time, the point labeled "Column A" is also +6 volts, the gating transistor will be cut-off and its collector will drop to zero volts. This forces the left-hand transistor of the flip-flop into conduction, and because of the feedback action previously described, the transistor changes start from the zero state to the one state.

Similar circuits are used in 2A, 3A, etc. Similar circuits are also used in the B column, the C column, the D column, and the E column. FIG. 6a shows these circuits only for the A column and for the B column, with some typical values of circuit components. The net result is that there are five columns of shift register flip-flops, each with 22 stages similar to the two which have been illustrated.

The flip-flop circuits shown in FIG. 6a have been illustrated without the equipment which makes them shift registers as well as flip-flops. The extra equipment to do this will be described in connection with FIG. 6b, which shows the circuit of timing generator 37 (FIG. 1), but which works stepwise in the same manner as the column registers.

FIG. 6b shows the so-called "T-Zero" flip-flop 116, the timing oscillator 118, and the timing register 119. The T-Zero flip-flop 116 is one of the standard type of flip-flops, which has been illustrated in FIG. 6a. This is set into the one state by the "OR BLACK" signal on line 51 (FIG. 1), i.e., if any one of the photocells sees black, this photocell is set into the one state. As soon as this flip-flop is set, it allows the timing oscillator 118 to start its cycle, by a signal on line 117. The details of the timing oscillator are shown in FIG. 6e. This timing oscillator is composed of two monostable flip-flops, sometimes called one-shot multivibrators. The circuit may be of a known type and will not be described in detail, but a special circuit is shown which is particularly well suited for this use. Each of these one-shot multivibrators is basically a flip-flop which is coupled with D.C. coupling from the first transistor to the second transistor, but the coupling back from the second transistor to the first transistor utilizes a capacitor rather than direct coupling. This means that it is as if it were a flip-flop which was set into the one state but it is able to remain in the one state only for a certain amount of time; this amount of time is determined by the value of the coupling capacitor and its associated resistors. As soon as the first one-shot multivibrator stops (i.e., goes from one state to the zero state), a trigger is passed to the second one-shot multivibrator. This trigger sets the second multivibrator to the one state, and this circuit stays in the one state until its natural time has run. At the time that this second circuit switches back from one to zero, it, in turn, passes a trigger back to the first one-shot multivibrator. This trigger then sets the first circuit to the one state again; this activity of first one of the circuits operating and then the other circuit operating continues until a reset signal is given to the T-Zero flip-flop on line 113a. This reset signal to the T-Zero flip-flop is obtained from the output of the last stage in the timing register, which will be described shortly. In the machines which have thus far been built, the timing oscillator goes through six complete cycles.

The timing register (FIG. 6b) consists of six flip-flops such as previously described, which are connected together as shift registers. Their operation is as follows: at the beginning, before a character is scanned, the first stage flip-flop is set to the one state. The outputs of the first stage flip-flop are connected to the trigger circuits of the next shift register stage in the following manner: the collector of transistor 126 is connected via line 125 to a point 127 joining a capacitor 128 and the anode of a diode 129 as shown in the diagram. The cathode of the diode 129 is connected to the base of the second transistor 131 of the second shift register stage. If, as is the case in our timing register, the first shift register stage is storing a one, point 127 will be at +6 volts. When a shift pulse comes along on line 121 from the timing oscillator 118, a pulse will be coupled through diode 129 to the base of transistor 131. This stage was storing a zero, which means that the righthand transistor 131 was conducting. This capacity coupled shift pulse will turn off transistor 131 in the second stage and, by the feedback process described earlier, will flip over the stage so that it is now storing the "one" state, i.e., the lefthand transistor 132 is now conducting and the righthand transistor 131 is not conducting.

If the "set" input to the first shift register stage is at +6 volts while the shift operation is taking place, the first stage will change from the "one" state to the "zero" state and the second stage will change from the "zero" state to the "one" state. The shift pulse is applied on line 121 to all of the shift registers in parallel. The shift pulse is derived from the output of the timing oscillator, and every time that the timing oscillator goes through a complete cycle, one shift pulse is derived. The end result is that the "one" which was initially stored in the first stage is transferred down the line. After this pulse arrives at the last stage, the T-Zero flip-flop, as well as the timing generator and register, is reset by a reset pulse on line 113*a* (FIG. 1).

Each of the stages T1 through T5 drives a power inverter 133–137 respectively, whose output becomes one of the column load pulses. Specifically, the output of the second stage becomes the load column A pulse, the third stage becomes the load column B, etc.

FIG. 6*c* shows the details of the vertical shift register 141, the shift oscillator 58 and the stop-shift gates 66. The individual column shift register flip-flops (Col. A to Col. E) are loaded at five different times as previously described and shown. At time T5 the shift flip-flop 55 is set (see FIG. 1) and this allows a shifting oscillator 58 to start. This shifting oscillator provides shift pulses to all of the shift registers in all of the columns at the same time. These shift registers operate in the manner which was described in FIG. 6*b*. When each shift pulse occurs, the information from the stage just immediately above any particular stage is transferred to that particular state, i.e., if it was a "one" which was stored in the next highest stage, then a "one" is transferred to the particular stage under discussion; meanwhile, the information which was stored in the particular stage under discussion is transferred to the stage immediately below it.

An OR-gate 66 is constructed which is very similar in construction to the OR-gate shown and described in FIG. 6*a*. This OR-gate 66 has 5 inputs 61–64; namely, the black output from shift register 1A, 1B, 1C, 1D and 1E. The shifting down operation occurs until any one of these points connected to the OR-gate recognizes a black. At this time, the OR-gate resets the shift flip-flop 55 and the shifting oscillator 58 is thus stopped.

EXPLANATION OF WHY AN ODD AND AN EVEN RESISTOR MATRIX IS BETTER THAN A SINGLE RESISTOR MATRIX

An interesting phenomenon occurs when the vertical scanning of a character or any pattern is accomplished by means of a finite number of discrete photocells, instead of being scanned by some continuous mechanism such as a hole in a mechanical scanning disk. This phenomenon is of importance in the art which is being taught in this patent application.

Let us assume that the character image shown in the upper left hand corner of FIG. 1 is passing by the photocells, as indicated. Assume that in FIG. 4*e* the image of a preferably square edged black line is moving from right to left across the back of four photocells illustrated. These four photocells are given the arbitrary numbers 7, 6, 5 and 4. The odd-numbered photocells, 7 and 5, are drawn as solid lines and the even photocells 6 and 4, are drawn as dotted lines. As the image of the black line passes over the photocells, number 6 photocell will be completely blacked out. The output of this photocell will be "black." Photocells number 5 and 7, however, will be covered exactly 50%. The problem now exists as to whether the output of photocells 5 and 7 should be called "black" or "white."

In order to explain this point more fully, let us retrogress and discuss why this particular geometrical configuration of photocells and a black line has ben chosen as an example. If it were desired to extract all the optical information from a piece of paper passing under an optical system, it would be necessary to have an infinitely large number of photocells in one column. Each of these photocells would be scanning a vanishingly small area. This would be undesirable not only from the standpoint of cost, but because all kinds of non-useful information, such as the grain in the paper and dust particles, would be picked up. This non-useful information would become a form of noise in the system and would, therefore, be undesirable. On the other hand, if only a few photocells were arranged in the line element, then much valuable information would be lost. By this we mean that certain parts of the character would make only small changes in the amount of light that the photocells see, and thus can not be picked up very satisfactorily. It becomes clear, therefore, that a compromise should be made. For the present purpose we have decided that a suitable compromise exists when the photocell aperture is approximately equal to the area of the smallest feature of the character image whose existence it is desired to recognize.

We now need to examine how close the spacing should be between such photocells. If a distance between photocells which is large compared to the character element is used, then it is obvious that many character elements will pass across the photocell area without their existence being recognized. If, on the other hand, the photocells are overlapped by a large percentage (for instance 90%) we then have the difficulty that a single line element influences a large number of photocells. It is possible to utilize such a system, but the photocell output must be quantized very carefully in the following manner: af a 90% overlap is used then a 10% change of line must be able to trigger the photocell output from "black" to "white" or from "white" to "black."

We have concluded that a quantizing level of 50% is approximately optimum, i.e. if 51% or greater of the photocell is illuminated with a standard white illumination, the photocell output is "white" and if 49% or less of the photocell is illuminated the output will be called "black." We also have determined that the photocell aperture should be equal to the line element. With these parameters, it should be clear that photocells just touching each other are not desirable because a line element which is slightly narrower than the standard could sneak through in such a way that the top photocell was only 49% black and the bottom photocell was only 49% black. Thus, in this case, no photocells would recognize that this slightly substandard line element had been scanned. Another judgment, therefore, has to be made on the percent of lap over these cells; we have settled upon the simple case of having 50% overlap. This is illustrated in FIG. 4*e*. FIG. 4*e* illustrates a typical situation. Four photocells are shown, 7, 6, 5, 4: the odd numbers 7 and 5, are shown as solid lines, and the even numbers, 6 and 4, are shown as dotted lines. The image of a perfectly square sided line element is moving from right to left across the photocells. Theoretically photocell number 6 will be completely covered by the line element, and photocells 7 and 5 will each be 50%, it is obvious that photocell number 6 will indicate a "black," but the outputs from photocells 7 and 5 are undetermined. In other words, photocell 7 could be either a black or white depending upon very small differences between line elements, photocells, photocell amplifiers, or noise in the power lines.

If the line element were a little higher it would cover, perhaps, 60% of cell 7, 90% of cell 6, and 40% of cell 5. This would result in the outputs of cells 7 and 6 being "black" and cell 5 being "white." If the line element were a little lower, covering 40% of 7, 90% of cell 6 and 60% of cell 5, then cell 7 would be "white," while cells 6 and 5 were "black."

It should be clear, therefore, that, while such a geometrical arrangement of photocells will always recognize the crossing of a line element in some way, the exact photocells which are "black" are not closely fixed. This apparent difficulty can be taken care of quite conveniently by the use of two semi-dependent resistor matrices, and this technique is one of the important features of this invention.

Looking now at FIG. 4c we see the character "F" displayed upon a full matrix 22 flip-flops high and 5 flip-flops wide. The "x's" in this matrix denote blacks which may be recognized by the even numbered photocells while the circles represent blacks which may be recognized by the odd numbered photocells. If, for example, all the line elements are a little small in the vertical direction and centered exactly on the even photocells, then the following arrangement will exist: all of the "x's" and circles in the A column will be present (except 19A which is less than 50% covered); all of the "x's" in the number 18 row and the number 12 row will be present; the squares in row 19A to 19E; row 17B to 17E; row 13B and C; and row 11B and C will be absent. If the image of the F is a little higher, the following area of blacks will exist: all of row 19; all of row 18; A in row 17, 16, 15, 14; in row 13, A, B and C will be black; A, B, C in row 12; A in rows 10, 9, 8, 7, 6. If the image is a little bit lower than that portion which exactly matches for the even photocells, then the following arrangement exists: all of row 18, all of row 17; A in 16, 15, and 14 and 13; A, B and C in rows 12 and 11; A only in rows 10, 9, 8, 7, 6.

The detailed discussion in the last paragraph about the places where blacks may be expected in the matrix should point up clearly that considerable differences in which flip-flops are black may be expected for only very small differences in the character height. We will now attempt to construct a single resistor matrix to recognize this "F," show the difficulties which are encountered and then show how this can be taken care of by using two semi-dependent matrices. From here on in this discussion, let us neglect the operation of down-shifting since the operation of down-shifting does not alter the relative positions of blacks and whites. For a first attempt at a resistor matrix, let us pick points such that all of the circles and crosses shown in FIG. 4b are put into the matrix for blacks. That is, all of the assertions of the following points will be tied to resistors: all of row 19; all of row 18; all of row 17; A only of rows 16, 15, 14; all of rows 13, 12, 11; A only of rows 10, 9, 8, 7, and 6. Now, for an image which is perfectly centered on the even cells (where the vertical distance of the line element is slightly less than nominal) we will have a number of flip-flop points which are white instead of being black. The wrong ones will be all of row 19, B, C, D, E in row 17; B, C in row 13; B, C in row 11. This will result in 13 wrong points of 32 points that are picked. Such a high percentage of wrong points would be almost certainly intolerable since the resistor matrix for some other character is very likely to have fewer wrong points. If the image were pushed slightly higher than this previous example or slightly lower, there would be fewer wrong elements; we are concerned, however, with making sure that the worst case is properly recognized. Let us consider another resistor matrix; let us pick assertions from all of row 18; A only in 17, 16, 15, 14, and 13; A, B, C in row 12; and A only in rows 11, 10, 9, 8, 7 and 6. This arrangement will score perfectly for a character which is centered perfectly on the even photocells. This is a much better choice, because a slight shifting upwards or downwards will still leave the selected points with blacks in them, and the information presented to the resistor matrix will still appear perfect. (Note that even in this case, it is dangerous and impossible to hook any negations to points such as 19A, B, C, D, E.) In order to show why this selection for a resistor matrix is still undesirable, it is necessary to have technical cognizance of another type of pick-up error: this type of error is caused by the apparent shrinkage or expansion in the vertical direction of a character. The way this error manifests itself is that while the top line of an image may be centered perfectly on the even photocells, the middle line (or bottom line) of the character may be centered on an odd photocell. Actually, such an arrangement of "stretch" or "shrink" has never been encountered in practice. What is much more likely to be encountered is the situation where the top line of a character will be centered just a little bit favoring the odd photocells and the bottom line would be centered favoring the even photocells. If a resistor matrix composed only of odd photocells or composed only of even photocells is used, it is clear that the answers will come out rather badly for certain cases and perfect for other cases.

Two more possible distortions must be mentioned. First, the edge of a line which is nominally straight all across the character may actually have some tilt on it, the result of this may be that a line may be favoring the odd photocells during the A and B scans and favoring the even photocells during the later scans. The second distortion that may occur is that the bottom-most point of a character may be quite ragged; the bottom-most point is a more critical position than any other point in the character because its position determines how far down the character will be shifted during the down-shifting operation. Thus, due to small variations in this bottom point, a character may end up in the flip-flop matrix with either most of its blacks in the odd rows or with most of its blacks in the even rows.

The solution to almost all of these difficulties is to be found by using two resistor matrices: an odd resistor matrix and an even resistor matrix. Going back to the example of FIG. 4c, we therefore teach that one resistor matrix should be constructed using the assertions from the following points: all of row 18; A only in rows 16 and 14; A, B, C in row 12; A only in rows 10, 8 and 6. A separate resistor matrix should be constructed using all of row 17; A only in rows 15 and 13; A only in rows 9 and 7. We also teach that these two resistor matrices should be connected to a common comparator transistor by some suitable means such as the emitter followers shown in FIG. 3. Let us say (for recognition of letter "A") that the resistor matrix denoted by A′ be the matrix which is connected to the odd rows, and that the resistor matrix denoted by $a''$ be the one whose resistors are connected to the even rows. Let us now examine the various cases to see how well this solution solves the various possible ambiguities and distortions that the character may have. First let us assume that the character is perfectly centered at top and bottom on the even photocells. After down-shifting, the character will end up with its horizontal lines well registered in the even rows, since the bottom point was not one of the even rows. The even resistor matrix will, therefore, be presented with a perfect set of assertions (and negations, if any have been put in) while the odd resistor matrix will be missing many of its points. Referring again to FIG. 3, we reason that A″ point will have a voltage which is closer to zero than the A′ point; the voltage will therefore be transferred through its emitter follower into the base of the comparator transistor. If, on the other hand, the vertical position of the scanned character was centered perfectly on the odd photocells, the down-shift will position the whole character in such a way that the bottom-most black will end up in an odd row, and all the horizontal lines of the character will end up in odd rows of the flip-flop register. This means that the odd resistor matrix will again have a perfect set of voltages presented to it and each voltage will be zero while the A″ point will be more positive than zero. The zero voltage will be coupled through the emitter follower to the comparator transistor. Let us now take the case where the character comes through exactly positioned one-half way between the odd rows and the even rows; in this case a complete double image will be found and both the odd matrix and the even matrix will see a perfect set of voltages applied to them. Note that the comparator transistor does not need to make a choice between these two voltages as they are equal.

It is important to realize that in none of the three foregoing examples where odd and even matrices are used, is there any degradation of the match voltage due to changes in vertical position. No advantage of the system of using two dependent matrices has been yet shown, however, over the case where a single resistor matrix hooked only to the odd rows has been shown.

The full advantage of the odd-even system becomes apparent when any one or more of the following three distortions are present: the bottom-most point is ragged, the character is stretched or shrunk vertically or the character is skewed slightly. Observe what will happen if all the horizontal lines of the character match up with the even photocells but the bottom-most point picks up an odd photocell. Due to the shift-down characters this will place all of the horizontal lines into the even resistor matrix and will give an almost perfect voltage for the match voltage, while the odd resistor matrix will have a very poor match. The best match voltage will appear at the comparator transistor. If only an odd resistor matrix had been used, a very poor answer would have been obtained. Conversely, if the character had come in well centered on the odd rows and had a bottom-most point which picked up even, then the best match would be found in the odd resistor matrix. Similar circumstances exist if the character is stretched or shrunk: the effect of this on the bottom-most point is very similar to that obtained when a ragged bottom-most point is obtained from poor printing. However, it is possible that the top line of a character may be centered better on the odd photocells and the middle or bottom line be contered better on the even photocells. The net result of this will be to give fairly good match voltages coming out of both the odd resistor matrix and the even resistor matrix; the comparator transistor will receive which ever of these two voltages shows up better, as is the object. Let us take a further example of a skewed or tilted character: parts of the horizontal lines may, for example, be picked up primarily by odd photocells and later in the C, D, and E columns be even photocells. The system of using odd and even resistor matrices will still give very good answers even though these do not have a perfect match. The system will pick out whichever of the two match voltages is best.

If recognition of skewed characters becomes a real problem, additional matrices may be constructed which have some odd points in them and some even points in them. An elaboration of this is to use zero gating in such a way that if either one of two points is black the input to one of the resistors in a resistor matrix is satisfied.

ALTERNATIVE TECHNIQUES

*Character Recognition Using Analog Storage*

It can be seen that one of the important advantages of the above type of reading machine is that no preliminary decisions are made before the choice of character is made, i.e., no intermediate recognition of vertical lines, horizontal lines, circles, etc. is made where these features are only part of the character. It turns out, however, that we have been making an implied set of early decisions by quantizing the signal amplitude into two states, black or white. This act of quantizing is in itself a decision, and many of the difficulties of character reading machines can be traced back to this decision making problem. Although the matching technique as described in this disclosure is, as described above, a most powerful character recognition technique known, it can be made still more powerful by the use of "gray-scale" or "analog" storage. If this is done, then mistakes due to calling a point black when it should have been white or vice versa will never happen. Actually, the grayness of an optical point is information which should not be thrown away, at least in a machine of ultimate recognition power.

There are at least two distinct ways of accomplishing the storage of the gray scale. One is to simply quantize into more states than just black and white; three states could be chosen, such as black, gray and white; or four, or ten. Let us suppose that we are going to store eight different states on the gray scale. This can be done digitally by having 8 flip-flops for each storage point (only one of which represents the stored value) or it can be done by having 3 flip-zops and using their combinations. The other technique is to use analog rather than digital storage to store a gray scale.

There are many other types of components which can be used for analog storage instead of the condenser arrangement shown, including magnetic devices, or adaptations of various other types of analog storage devices, which it is not within the scope of the present disclosure to describe in detail. However, it is within the broad scope of the invention to utilize such arrangements for taking into account the "grayness" factor of the character being read.

FIG. 7 shows some storage circuits of a character recognition machine using capacitor type analog storage. Referring to the circuit of FIG. 7, the lefthand two diodes 130 and 131 form an AND-gate. One of these diodes is connected to the output of a photcell amplifier, for example, #22 of FIG. 1, and the other is connected to the load-column A timing pulse (line 41). The load-column A pulse on line 42 is a pulse which has a completely binary amplitude, i.e., it goes from 0 volts to +6 volts during the time that it is desired to load the storage registers of column A. The output of the photocell amplifier, however, is a voltage which varies between 0 volts and +6 volts according to how gray the spot is which was seen. For instance, let 0 volts represent white, +3 volts indicate an intermediate gray, and +6 volts represent completely black. When the load-column A pulse goes up to +6, then the voltage at point 132 will rise to whatever potential is present on the output of the photcell amplifier. Let us say this is +4 volts. This +4 volts is transferred to the capacitor 133 (which has been previously reset to 0 volts). The capacitor is followed by a double emitter follower 134 to provide isolation so that the charge on the capacitor will not leak off too fast. The double emitter follower drives one side of a differential amplifier 136. The differential amplifier will produce voltages on its two collectors which are complements of each other. The circuits are so designed so that for a +4 stored on the capacitor the lefthand collector line, 137, of the differential amplifier will give −4 volts and the righthand collector line, 138, will give −2 volts. These complementary outputs will be used in the resistor matrices to help make the character decision, thereby introducing the "grayness" of the scanned character as a factor in the decision made by the best voltage selector.

There is a little more machine philosophy that needs to be discussed in connection with a character reader which stores using analog methods. The methods of loading the storage registers have been discussed, but as yet, no discussion has been made of how these storage points can be moved with respect to the resistor matrices corresponding to the poistional down-shifting of FIG. 1. If gray-scale storage is used with, say, three flip-flops per point, then shifting can be accomplished in a manner very similar to that already discussed, i.e., for every single shift register stage that is shown in FIG. 1, 3 shift register stages could be used. Analog forming resistors can then be used to generate the particular analog levels preliminary to going into the regular resistor matrices.

If pure analog storage is used however, such as the capacitor storage as shown in FIG. 7, the construction of analog shift registers becomes much more difficult. Theoretically it is possible to transfer analog signals from one stage to another, but in practice this would probably not be done. The simplest method for taking care of this is to build a great many additional resistor matrices, all up and down the entire vertical range in which characters are expected to appear. This then obviates the necessity for any vertical shifting whatsoever. This technique could be very expensive, however. Another method of taking care of this problem is to have a set of photocells which look at the character before the regular set of photocells. This is called a "pre-look." These photocells generate information which tells the main equipment at what height to store the information. Effectively then, we could have 22 "pre-look" photocells, 22 main photocells, and 5 columns of storage registers, each register being only 14 stages high. The pre-look tells the switching circuits which group of main photocells should be connected to the storage stages; thus all of the storage stages are always used, and no further vertical positioning needs to be done.

This technique of the pre-look can also be very effectively used in discovering where one character ends and another character begins; this will be discussed in more detail a little later in this application.

*Alternate Method of Positioning Characters*

Often in reading characters the printing will be so bad that a bottom dot may be left off a character or an extra dot at the bottom of a character can be picked up. Also, despite careful design of optical apertures, dirt and wayward ink spots get picked up and put into the storage registers at extraneous positions. The "shift-down" method of normalizing the vertical position of a character which was illustrated early in this patent application (see FIG. 1) has the disadvantage that it is quite sensitive to such pick-up. This is illustrated in FIG. 8 which illustrates alternate methods of positioning the characters. At the left of this figure we have shown the character L as it might have come into a set of storage registers before shifting down. The black points are designated by X's. Underneath the L we have shown a single black point which is circled. Let us assume that this was a piece of dirt which was picked up. If the simple shift-down technique is used (see FIG. 1) then the equipment will stop shifting down as soon as this circled black hits the bottom of one of the registers. This will obviously throw off the vertical positioning of the character three units from its correct position. To illustrate the general nature of this principle, it will be discussed for the case of a 6 x 9 matrix instead of a 5 x 7 matrix as in FIG. 1.

An alternate method of positioning characters to match their pre-constructed resistor matrices is to use the method which we call "center of black." To accomplish center of black positioning, we merely draw an arbitrary horizontal line and shift the character down (or up) until there are as many black points above this line as there are below this line. Thus, in the middle illustration of L we have shown 7 black points above the line and 7 black points below the line, neglecting the circled black. In this particular example it can be seen that the final position of the character can be thrown off only one vertical unit by the presence of a single black point. If we count the circled X, then there are 8 below the line and 7 above the line. If the equipment had chosen to shift the character up one unit then there would be 8 above and 7 below. In any case, the positioning is off only by one unit and not by 3 units.

Another type of positioning is the "center of gravity" positioning. In this technique we weigh each black point by the distance it is from the arbitrary horizontal line—the L has, therefore, 21 units above the horizontal line and 21 units below the horizontal line, neglecting the circled black. If the black is included, however, we have 6 extra units below the line. In this case the equipment would be tempted to move the whole character up one notch. It can be seen that a single black undesired point can affect the positioning of the characters more undesirably using the center of gravity positioning than using the center of black positioning.

It can be seen that this same technique can be used to position the characters on a left-right basis as well as on an up-down basis. In general, however, the horizontal positioning is taken care of by the start of characters, and is normally very close to a known point anyway.

One of the important uses for the center of black positioning method will occur when it is desired to read characters from many different sources in the same machine. In such machines it is necessary to use a very much larger number of storage stages in order to resolve the detail of some of the small characters, particularly the lower case characters of a 12-point typewriter font. With such high resolution, the outlines of the characters become quite blurry, and it is advantageous to use a center of black positioning instead of trying to shift down to an non-flat outline point. We can also practically ignore small differences in font such as the exact positions of the serifs.

*Methods of Detecting the Beginning and End of Overlapping Characters*

In all the character reading techniques we have discussed so far, it has been explicitly assumed that the characters have at least a small cleared white space between these characters. In some typewriters this is distinctly not the case. In particular, most portable typewriters have two lower case m's touching. This is due, of course, to the fixed unit of horizontal width which is allowed for each character on a typewriter. This fixed unit of width is actually helpful in building fixed timing for the character reading machine, but it is harmful when it allows characters to touch.

Even when characters are not actually touching, they oftentimes overlap. Such a case is illustrated in FIG. 9 which shows the principle of a device or system for reading such characters which we term a "snake" space detector. In the upper left hand corner of this drawing an "F" and an "A" are illustrated in such a way that full clear horizontal space does not occur between the characters, although there is a vertical space between their nearest portions. This vertical space, however, can be recognized by the use of the following techniques. Let us assume that the characters are just 7 units high. We then build two shift registers 7 units high as shown at 140 and 141. These are connected in such a way that they can shift downwards and sidewise also. This set of shift registers has been illustrated at three different times: T4, T5, and T6. They are constructed in such a way that the information in column 141 can be shifted down and returned around the loop up to the top and to its original starting point, then the information from column 141 is shifted leftwards to column 140. In the illustration at time T4 we have blacks in positions 1 and 4 of column 140 and a black in position 1 of column 141. At time T5 we have a black in position 1 of column 140 and position 1 of column 141 and blacks in positions 3, 4, 5, 6, 7 of column 141. Under the illustration for time T6 we have shown the additional logic which is necessary to determine whether a space is present. The rules are as follows: (1) If we have adjacent blacks at any point (a horizontal pair) then there is no space; (2) If we have an ascending diagonal pair in vertically adjacent stages there is no space; (3) If we have a descending diagonal pair in vertically adjacent stages there is no space.

The way this works then is as follows: we load the registers and then start shifting both column 140 and column 141 downwards. There is an extra shift register stage 142 and 143 respectively inserted in each of the columns which has the effect of providing one unit delay when desired. The three AND gates 144, 145 and 146 respectively recognize each one of the three conditions that we have specified for deciding that there is no space. If during the entire shift cycle we have any one of the AND-gates giving a coincidence, then the flip-flop 149 is reset through the OR-gate 150. At the end of shift, we interrogate the output of the flip-flop with another AND-gate 150. If the flip-flop is still in the set condition then this means that we have a space. If, on the other hand, any one of the three AND-gates has been satisfied one or more times, then the flip-flop 149 has been reset and the interrogation of the flip-flop by a pulse on line 82 will not satisfy the space AND-gate and there will be no signal emitted on line 82*a*.

This is only one of a number of possible methods of ascertaining if there is a "snake" separation, that is, a vertical separation between adjacent letters which have no horizontal separation.

The detection of the end of a character in situations where they really are touching turns out to be a rather simple matter because of the way in which typewriters are constructed. This is so because the only time we will ever have characters that touch are on machines that have a fixed character spacing. Therefore, our machine can (using a pre-look system) make a decision about what the standard spacing of the characters is for any particular printed material which is presented to it. Having decided what this character is, it will then be able to set up its timing register in such a way that the end of character signal is given by internal timing. As a whole row of touching characters occurs, the timing machinery will find out what is the lowest common multiple of this group of characters and specify that group as being that many characters. All variable character width typewriters leave clear spaces.

The above examples are given by way of illustration to show the manner in which a reading machine according to the invention can solve various practical problems that may occur and to demonstrate the great flexibility of the reading technique exemplified in FIG. 1.

It will be apparent that the embodiments shown are only exemplary and that various modifications can be made in construction and arrangement within the scope of our invention as defined in the appended claims.

We claim:

1. Character recognition means comprising means for illuminating the area of a character to be recognized, means for dividing said area into a plurality of elemental areas; photo-sensitive means for scanning said elemental areas to produce a separate signal for each area, which signal is a function of the optical quality of its area; conversion means for simultaneously receiving the signals from a first selected configuration of said elemental areas and converting said simultaneously received signals into a unique set of values corresponding to said configurations; further conversion means for receiving the signals from further selected configurations of said elemental areas to produce other unique sets of values; and comparison means for comparing said sets of values to determine which set corresponds most closely to the configuration of the character to be recognized, and for producing a unique output signal indicative of the character thus determined.

2. Character recognition means comprising means for illuminating the area of a character to be recognized, means for dividing said area into a plurality of elemental areas; photosensitive means for scanning said elemental areas to produce a separate signal for each area, which signal is a function of the optical quality of its area; conversion means for receiving the signals from a selected combination of said elemental areas and converting said received signals into a unique set of values corresponding to the configuration of the character being scanned; means for comparing said set of values with a plurality of sets of values corresponding to various possible characters to be recognized, means for indicating the value to which said unique set of values most closely corresponds, and means producing a "reject" signal if none of the sets of values resulting from a scan of a character corresponds to a predetermined degree with any of said plurality of sets of values.

3. The invention according to claim 2, said last means including adjustable control means to provide a selective reject level for the character recognition means.

4. Character recognition system comprising means for moving an image of a character to be recognized, with constant linear motion, across a linear recognition zone; means to illuminate said zone; an array of individual photosensitive cells arranged transversely to the line of motion of the character to respond individually to light from said zone, the individual cells responding respectively to a series of successively adjacent areas of said zone whereby the photocells scan a character crossing said zone; a plurality of registers, each comprising a set of bistable elements, each set containing a separate bistable element associated with each of said cells and responsive to the light received by its associated cell to assume one or the other of its stable conditions in accordance with the light received by said cell; means for effectively connecting each of said sets in succession to said array of photocells as the character to be recognized crosses said zone, whereby the respective conditions of the bistable elements of the plurality of sets represents the configuration of the character; and means for translating the said condition of the bistable elements into a signal uniquely representing said character, each set of bistable elements containing more elements than are required by the maximum dimension of the part of the character being scanned, each set being connected as a shift register, and means producing a shift signal, after all the sets have been actuated, to simultaneously shift all of the information stored in the bistable elements to a predetermined position at one end of the shift register.

5. Character recognition system comprising means for moving an image of a character to be recognized, at a constant rate, across a recognition zone extending transversely to the direction of said motion; a linear array of photosensitive devices arranged to respond to the optical condition of a linearly extending first set of adjacent elemental areas of said zone to thereby scan said image as it moves across the zone; a second linear array of photosensitive devices similarly arranged to respond to said linearly extending set of adjacent elemental areas, the devices of said second array being staggered with respect to those of the first set so that the respective centers of the elemental areas of the second set lie transversely between the respective centers of areas of the first set, and the respective areas of the two sets overlap; a plurality of registers, each comprising a set of bistable elements, each set containing a separate bistable element associated with each of said devices and responsive to the light received by its associated device to assume one or the other of its stable conditions in accordance with the light received by said device; means for effectively connecting each of said sets of bistable elements in succession to said array of photocells as the character to be recognized crosses said zone, whereby the respective conditions of the bistable elements of the plurality of sets represents the configuration of the character; said last means including a timing generator for emitting a timing pulse to each of said registers in turn as a character crosses the recognition zone; initial signal means responsive to an indication produced in any one of said photosensitive devices by the leading edge of a character to initiate operation of said timing generator; and gating means for each register responsive to said timing pulses for gating the respective signals from said photosensitive devices to the respective bistable elements of each register in turn as the character image crosses the recognition zone, whereby the respective bistable elements of the registers assume conditions corresponding to the configuration of the character.

6. The invention according to claim 5, each of said bistable elements having two output terminals, the first terminal being at a higher voltage level than the second terminal in the normal condition of the element, and at a lower voltage level in the "set" condition of the element; a resistor matrix comprising a number of resistors connected at one end to a common terminal point, the other end of each resistor being connected to one of said output terminals in a configuration corresponding to a possible character of the set of characters being scanned, whereby the voltage level at said common terminal point provides an indication of the correlation between said possible character and the actual character being scanned.

7. The invention according to claim 6, certain of said resistors being connected to the first terminals of associated bistable elements and others being connected to the second terminals of associated bistable elements whereby complementary signals are received from said bistable elements.

8. The invention according to claim 7, and additional similar resistor matrices, one for each possible character of a set of characters to be recognized, each said matrix being connected to certain of said output terminals in a configuration corresponding to the character which it represents, and each matrix having its own common terminal; and voltage-responsive selector means responsive to the optimum voltage at said common terminals to select the matrix having the best correlation with the character being scanned.

9. The invention according to claim 8, said selector means comprising voltage responsive means set to a predetermined voltage level, means for comparing all of the voltages at said common terminal with said voltage level, and means responsive to the best voltage match for selecting the corresponding matrix.

10. The invention according to claim 5, including means for comparing signals from respective bistable elements connected to said first array of photosensitive devices and corresponding adjacent respective elements connected to said second array; means responsive only to the optimum ones of said signals to produce an output signal corresponding to said optimum signal from each two elements being compared; means for comparing the values of said output signals from a selected configuration of bistable elements with a plurality of sets of values corresponding to various possible characters to be recognized; and means for indicating the value to which said selected configuration most nearly corresponds.

11. Character recognition system comprising means for moving an image of a character to be recognized, with constant linear motion, across a linear recognition zone; means to illuminate said zone; an array of individual photosensitive cells arranged transversely to the line of motion of the character to respond individually to light from said zone, the individual cells responding respectively to a series of successively adjacent areas of said zone whereby the photocells scan a character crossing said zone; a plurality of registers, each comprising a set of bistable elements, each set containing a separate bistable element associated with each of said cells and responsive to the light received by its associated cell to assume one or the other of its stable conditions in accordance with the light received by said cell; means for effectively connecting each of said sets in succession to said array of photocells as the character to be recognized crosses said zone, whereby the respective conditions of the bistable elements of the plurality of sets represents the configuration of the character; and means for translating the said condition of the bistable elements into a signal uniquely representing said character, and means for determining the end of a character which is separated from an adjacent character by at least a vertical spacing corresponding to the vertical scan width of one of said photosensitive cells, said means comprising signal means successively and respectively responsive to the optical conditions reproduced in two adjacent sets of said bistable elements to produce signals indicating the presence of character markings in the areas to which said sets correspond; coincidence means responsive to the combined signals from any pair of horizontally or diagonally adjacent ones of said signal means to indicate that the end of the character has not been reached; and means operative upon failure of at least one of such combined signals to be produced to indicate that the end of the character being scanned has been reached.

12. The invention according to claim 11, said signal means comprising two further sets of bistable elements corresponding respectively to said two adjacent sets of bistable elements and respectively settable in response to the optical marking conditions of their associated area; said coincidence means comprising three coincidence gates connected respectively to two horizontal adjacent bistable elements of said signal means, to two upwardly sloping diagonally adjacent elements and to two downwardly sloping diagonally adjacent elements of said signal means.

13. Character recognition means comprising means for illuminating the area of a character to be recognized, means for dividing said area into a plurality of elemental areas; photosensitive means for scanning said elemental areas to produce a separate signal for each area, which signal is a function of the optical quality of its area; conversion means for receiving the signals from a selected combination of said elemental areas, including means for giving greater weight to the signals from some of said selected areas than to those from other areas so as to emphasize features or the lack of features in a given position of an unknown character, and means for converting said received signals into a unique set of values corresponding to the configuration of a character being scanned; means for comparing said set of values with a plurality of sets of values corresponding to various possible characters to be recognized, and means for indicating the value to which said unique set of values most closely corresponds.

14. Character recognition system comprising means for moving an image of a character to be recognized across a linear recognition zone; an array of individual photosensitive cells arranged transversely to the line of motion of the character, the length of said array being considerably longer than the height of the character, so that only certain adjacent ones of the cells, corresponding to the height of a character, are affected by light signals from the character, thereby determining the vertical position of said character; and a second array of photocells in the line of motion of the character, and means transmitting vertical positioning information from said first array of photocells to said second array of photocells.

15. Character recognition means comprising means for illuminating the area of a character to be recognized, means for dividing said area into a plurality of elemental areas; photosensitive means for scanning said elemental areas to produce a separate signal for each area, which signal is a function of the optical quality of its area; a memory matrix of bistable elements arranged to correspond respectively to each of said elemental areas; means for transferring said separate signals to the respective corresponding bistable elements of said matrix for temporary storage; character representation means connected to selected elements of said storage matrix in a pattern corresponding to a particular character for simultaneously receiving correlation signals from said respective elements of the matrix indicative of the presence or absence of a stored signal, to produce a total correlation signal representative of the correspondence between the stored signal and said pattern; other character representation means connected to other selected elements of said matrix in other patterns corresponding to other particular characters to produce other total correlation signals; and means for selecting a particular total correlation signal as representative of the character stored in said matrix.

16. The invention according to claim 15, said last means comprising means for simultaneously comparing all of said total correlation signals and selecting an optimum one of said signals as indicative of the character stored in said matrix.

References Cited in the file of this patent

UNITED STATES PATENTS

| | | |
|---|---|---|
| 2,613,809 | Potts | Oct. 14, 1952 |
| 2,682,043 | Fitch | June 22, 1954 |
| 2,831,987 | Jones | Apr. 22, 1958 |
| 2,918,653 | Relis | Dec. 22, 1959 |
| 2,924,812 | Merritt et al. | Feb. 9, 1960 |
| 2,932,006 | Glauberman | Apr. 5, 1960 |
| 2,978,675 | Highleyman | Apr. 4, 1961 |